US012556783B2

(12) United States Patent
Gallagher

(10) Patent No.: US 12,556,783 B2
(45) Date of Patent: Feb. 17, 2026

(54) CLOUD-BASED SHAREABLE MEDIA PLATFORM

(71) Applicant: Timecap LLC, Irvine, CA (US)

(72) Inventor: Charles Gallagher, Irvine, CA (US)

(73) Assignee: Timecap LLC, Irvine, CA (US)

( * ) Notice: Subject to any disclaimer, the term of this patent is extended or adjusted under 35 U.S.C. 154(b) by 23 days.

(21) Appl. No.: 18/267,035

(22) PCT Filed: Jun. 12, 2023

(86) PCT No.: PCT/US2023/068320
§ 371 (c)(1),
(2) Date: Jun. 13, 2023

(87) PCT Pub. No.: WO2023/244986
PCT Pub. Date: Dec. 21, 2023

(65) Prior Publication Data
US 2024/0397169 A1    Nov. 28, 2024

Related U.S. Application Data

(60) Provisional application No. 63/351,744, filed on Jun. 13, 2022.

(51) Int. Cl.
*H04N 21/845*    (2011.01)
*H04N 21/462*    (2011.01)
*H04N 21/858*    (2011.01)

(52) U.S. Cl.
CPC ......... *H04N 21/845* (2013.01); *H04N 21/462* (2013.01); *H04N 21/858* (2013.01)

(58) Field of Classification Search
CPC .................................................. H04N 21/858
See application file for complete search history.

(56) References Cited

U.S. PATENT DOCUMENTS

| | | | |
|---|---|---|---|
| 6,408,128 B1 * | 6/2002 | Abecassis | G11B 27/034 |
| | | | 348/E7.071 |
| 8,494,346 B2 * | 7/2013 | Abecassis | H04N 21/4725 |
| 8,868,666 B1 * | 10/2014 | Hellwege | H04N 21/4622 |
| | | | 709/206 |
| 10,419,790 B2 * | 9/2019 | Gersten | H04N 21/454 |
| 10,943,125 B1 * | 3/2021 | Evans | H04N 21/4788 |
| 11,190,736 B2 * | 11/2021 | Kawakami | H04N 7/17318 |
| 11,317,134 B1 * | 4/2022 | Barnett | H04N 21/23424 |
| 11,601,721 B2 * | 3/2023 | Bloch | H04N 21/8541 |
| 11,627,357 B2 * | 4/2023 | Lu | H04N 21/2743 |
| | | | 725/32 |
| 12,063,423 B1 * | 8/2024 | Neuweg | H04N 21/8541 |
| 12,126,866 B2 * | 10/2024 | dePaz | H04N 21/4436 |
| 12,141,845 B2 * | 11/2024 | Loghmani | G06Q 50/01 |
| 12,190,915 B2 * | 1/2025 | Rabinowitz | H04N 21/23106 |
| 12,216,700 B2 * | 2/2025 | Taboriskiy | H04N 21/4722 |
| 2005/0060641 A1 * | 3/2005 | Sezan | H04L 12/2805 |
| | | | 715/202 |

(Continued)

*Primary Examiner* — An Son P Huynh

(57) ABSTRACT

A method for providing a shareable media hosting platform includes recording, by a user device, multiple video segments corresponding to a narrative of a user. The method further includes storing, in a memory, the multiple video segments. The method also includes combining, by a processor and in response to a request from the user device, the multiple video segments into a single video stream that tells the narrative of the user.

17 Claims, 8 Drawing Sheets

(56) References Cited

U.S. PATENT DOCUMENTS

| | | | |
|---|---|---|---|
| 2007/0074115 A1* | 3/2007 | Patten | G11B 27/032 |
| 2012/0047542 A1* | 2/2012 | Lewis | H04N 21/44016 |
| | | | 725/97 |
| 2014/0003799 A1* | 1/2014 | Soroushian | H04N 9/8042 |
| | | | 375/240.12 |
| 2015/0019968 A1* | 1/2015 | Roberts | G11B 27/28 |
| | | | 715/719 |
| 2015/0093093 A1* | 4/2015 | Abecassis | H04N 21/4884 |
| | | | 386/201 |
| 2016/0105708 A1* | 4/2016 | Packard | H04N 21/25841 |
| | | | 725/10 |
| 2017/0006322 A1* | 1/2017 | Dury | H04N 21/254 |
| 2017/0070779 A1* | 3/2017 | Kim | H04N 21/8549 |
| 2017/0072301 A1* | 3/2017 | Abecassis | A63F 9/183 |
| 2018/0025078 A1* | 1/2018 | Quennesson | H04N 21/4788 |
| | | | 725/141 |
| 2020/0043104 A1* | 2/2020 | Ri'Chard | G06Q 50/01 |
| 2020/0112772 A1* | 4/2020 | Kingori | H04N 21/8541 |
| 2020/0120097 A1* | 4/2020 | Amitay | G06F 3/0488 |
| 2021/0211750 A1* | 7/2021 | Loheide | H04L 65/611 |
| 2021/0297719 A1* | 9/2021 | Loheide | H04N 21/2187 |
| 2021/0312318 A1* | 10/2021 | Ambrozic | G06N 3/088 |
| 2021/0385417 A1* | 12/2021 | Park | G06F 3/0484 |
| 2022/0078500 A1* | 3/2022 | Lu | H04N 21/2743 |
| 2022/0191573 A1* | 6/2022 | Gladwell | H04N 21/2743 |
| 2022/0321970 A1* | 10/2022 | Swanson | G06V 20/46 |
| 2024/0107127 A1* | 3/2024 | Chen | H04N 21/4312 |
| 2024/0137610 A1* | 4/2024 | Fishman | H04N 21/4668 |

* cited by examiner

CLOUD-BASED SHAREABLE MEDIA PLATFORM

CROSS-REFERENCE TO RELATED APPLICATIONS

This application claims the benefit and priority of U.S. Provisional Patent Application No. 63/351,744, titled "Story Form Social Media Platform" and filed on Jun. 13, 2022, the entire contents of which being hereby incorporated by reference herein.

BACKGROUND

1. Field

The present disclosure is directed to systems and methods for at least one of creating or sharing documentary videos.

2. Description of the Related Art

With the invention of the smartphone camera, many individuals can take photos and videos of their day-to-day experiences. Such photos and videos may be stored chronologically in a memory of the phone (e.g., in a photo library) and may be organized into albums by the user. This media may be sent as text messages and emails to family and friends, shared on social media sites, or the like. However, these photos and videos are each distinct pieces of media that may only be viewed one at a time, and an entire photo library may have many extraneous photos or videos that are unrelated to the life of the individual.

Options exist that allow users to create home videos using video editing software or tools available via social media applications; however, none of these options automatically edit and compile a video in real time. Creating a well-narrated video using pictures and videos as inputs (and potentially including stock footage) generally requires a user to hire a professional videographer or obtain experience navigating complex do-it-yourself video editing software or social media applications.

Thus, there is a need in the art for systems and methods for generating and sharing story-form media narratives.

SUMMARY

Described herein is a method for providing a shareable media hosting platform. The method includes recording, by a user device, multiple video segments corresponding to a narrative of a user. The method further includes storing, in a memory, the multiple video segments. The method further includes combining, by a processor and in response to a request from the user device, the multiple video segments into a single video stream that tells the narrative of the user.

Any of the foregoing embodiments may further include: storing, by a server, the single video stream; associating, by the server, the single video stream with a specific hyperlink; and generating, by the processor, a quick response (QR) code containing information corresponding to the specific hyperlink associated with the single video stream.

Any of the foregoing embodiments may further include: detecting, from the user device or from another user device, image data corresponding to the QR code; deciphering, by the user device or the another user device, the specific hyperlink from the QR code; accessing, by the user device or the another user device, an internet location of the specific hyperlink; and displaying, by the user device or the another user device, the single video stream in response to accessing the internet location using the specific hyperlink.

Any of the foregoing embodiments may further include automatically editing, by the processor, the single video stream to improve a quality of the single video stream.

In any of the foregoing embodiments, automatically editing the single video stream includes at least one of: reducing delay between at least two of the multiple video segments; adjusting at least one of a contrast, a brightness, or a coloring of at least one of the multiple video segments; adjusting at least one of a volume, a compression, or an equalization of audio of at least one of the multiple video segments; transcribing spoken words from at least one of the video segments into text and creating time-synced video captions based on the text; adjusting a volume of at least one of speech or music for at least one of the multiple video segments; or adding at least one of a map view or a street view of a location mentioned in at least one of the multiple video segments.

In any of the foregoing embodiments, automatically editing the single video stream includes: identifying a sentiment corresponding to at least one of the multiple video segments; and selecting and inserting music into the single video stream based on the identified sentiment.

In any of the foregoing embodiments, the processor is at least one of a processor of the user device or a processor of a server in communication with the user device.

Any of the foregoing embodiments may further include: storing, by a server, a profile corresponding to the user of the user device; linking, by the server, the profile with another profile of another user based on a request from the user device or from another user device associated with the another profile; and facilitating, by the server, viewing of the single video stream by the another user device based on the link between the profile with the another profile.

Any of the foregoing embodiments may further include: determining, based on information received from at least one of the user device or the another user device, that the user is related to the another user; determining, based on information received from the user device, that the single video stream is approved for viewing by family members only; and allowing, by the server, the another user device to view the single video stream in response to determining that the user is related to the another user.

Any of the foregoing embodiments may further include: determining, by the processor and in response to user input, a theme of the narrative of the user; accessing, by the processor, a list of prompts associated with the determined theme; and outputting, by the user device, the prompts associated with the determined theme, such that each of the multiple video segments are recorded in response to one of the prompts.

Any of the foregoing embodiments may further include: receiving, by the processor, additional media associated with the narrative of the user; and combining, by the processor, the additional media with the multiple video segments such that the single video stream includes the multiple video segments and the additional media.

Any of the foregoing embodiments may further include: outputting, by the user device, a list of manual video editing functions available for manual editing of the single video stream; receiving, by the user device, information corresponding to manual edits to the single video stream; and editing, by the processor, the single video stream based on the information corresponding to the manual edits to the single video stream.

Also described is a system for providing a shareable media hosting platform. The system includes a user device having a camera configured to capture image data, the user device configured to record multiple video segments that each correspond to a narrative of a user. The system further includes a memory configured to store the multiple video segments. The system further includes a processor configured to combine the multiple video segments into a single video stream that tells the narrative of the user in response to a request from the user device.

Any of the foregoing embodiments may further include a server configured to store the single video stream and to associate the single video stream with a specific hyperlink, wherein the processor is further configured to generate a QR code containing information corresponding to the specific hyperlink associated with the single video stream.

In any of the foregoing embodiments, the processor is further configured to automatically edit the single video stream to improve a quality of the single video stream.

In any of the foregoing embodiments, automatically editing the single video stream includes at least one of: reducing delay between at least two of the multiple video segments; adjusting at least one of a contrast, a brightness, or a coloring of at least one of the multiple video segments; adjusting at least one of a volume, a compression, or an equalization of audio of at least one of the multiple video segments; transcribing spoken words from at least one of the video segments into text and creating time-synced video captions based on the text; adjusting a volume of at least one of speech or music for at least one of the multiple video segments; or adding at least one of a map view or a street view of a location mentioned in at least one of the multiple video segments.

In any of the foregoing embodiments, automatically editing the single video stream includes: identifying a sentiment corresponding to at least one of the multiple video segments; and selecting an inserting music into the single video stream based on the identified sentiment.

In any of the foregoing embodiments, the processor is further configured to determine a theme of the narrative of the user based on user input received by the user device, and to access a list of prompts associated with the determined theme, and the user device is further configured to output the prompts associated with the determined theme such that each of the multiple video segments is recorded in response to one of the prompts.

Also disclosed is a method for providing a shareable media hosting platform. The method includes outputting, by a user device, a plurality of prompts each associated with a selected theme. The method further includes recording, by the user device, multiple video segments corresponding to a narrative of a user, each of the multiple video segments being provided in response to one of the plurality of prompts. The method further includes storing, in a memory, the multiple video segments. The method further includes combining, by a processor and in response to a request from the user device, the multiple video segments into a single video stream that tells the narrative of the user. The method also includes automatically editing, by the processor, the single video stream to improve a quality of the single video stream. The automatically editing including at least one of: reducing delay between at least two of the multiple video segments, adjusting at least one of a contrast, a brightness, or a coloring of at least one of the multiple video segments, adjusting at least one of a volume, a compression, or an equalization of audio of at least one of the multiple video segments, transcribing spoken words from at least one of the video segments into text and creating time-synced video captions based on the text, adjusting a volume of at least one of speech or music for at least one of the multiple video segments, or adding at least one of a map view or a street view of a location mentioned in at least one of the multiple video segments.

Any of the foregoing embodiments may further include: outputting, by the user device, a list of manual video editing functions available for manual editing of the single video stream; receiving, by the user device, information corresponding to manual edits to the single video stream; and editing, by the processor, the single video stream based on the information corresponding to the manual edits to the single video stream.

BRIEF DESCRIPTION OF THE DRAWINGS

Other systems, methods, features, and advantages of the present disclosure will be or will become apparent to one of ordinary skill in the art upon examination of the following figures and detailed description. It is intended that all such additional systems, methods, features, and advantages be included within this description, be within the scope of the present disclosure, and be protected by the accompanying claims. Component parts shown in the drawings are not necessarily to scale, and may be exaggerated to better illustrate the important features of the present disclosure. In the drawings, like reference numerals designate like parts throughout the different views, wherein:

DETAILED DESCRIPTION

Figure 1:
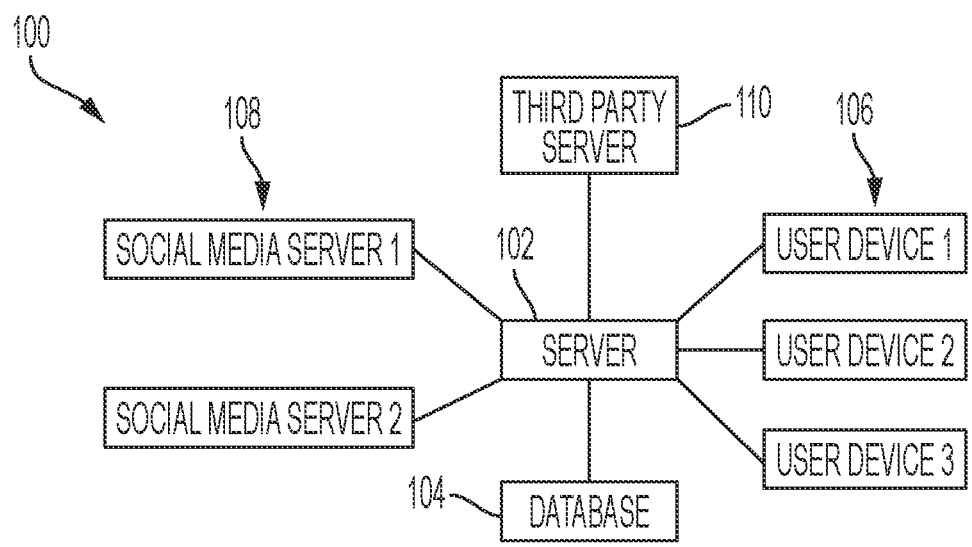
FIG. 1 is a block diagram of a system for providing a shareable video hosting platform, according to some embodiments of the present disclosure.

The present disclosure describes systems and methods for providing a new type of shareable video hosting platform (which may include features of a social media platform) that allows users to communicate and share life information and other events (e.g., relating to a pregnancy, an autobiography, a message from a grandfather to future grandchildren, or the like). The systems and methods provide automatic video editing capabilities such that professional videographer or video editing skills are not required to generate a high-quality video. By utilizing the auto-editing video capture package of the present disclosure along with built-in guided prompts as part of the shareable video hosting platform, users of the present disclosure may easily create professional grade videos that can be shared on the shareable video hosting platform, a separate social media platform, the internet, the decentralized web, metaverse applications, or the like.

To begin the process, a user may select a theme associated with a particular story they would like to tell (e.g., the theme may correspond to or include a pregnancy, a story of how a family business originated, a story about a family's immigration to a new country, or the like), and the platform may generate or retrieve a specific list of questions associated with the theme. The user may answer the questions with video, still images, audio, text, or the like and the platform may store the answers. After the user has answered all of the questions, the platform may compile all of the answers into a video format. Such compilation may be automatically performed without feedback by the user; however, a user may also edit the compiled video to incorporate his or her preferences. The platform may provide certain video, image, and audio processing capabilities to allow the user to edit the compiled video.

After the video is compiled and edited, the platform may generate a unique quick response (QR) code linked to the video, the QR code operating similar to a barcode to identify the video or a stored location of the video. The user may share the QR code to allow others (e.g., family or friends) to quickly access and view the video. The unique QR associated with the video may be placed on headstones, programs (e.g., pamphlets or software), business cards, advertisements, and much more. After (or before) a video has been compiled, the user may come back at any time to answer more questions, or more thoroughly answer questions. The user may add more content (i.e., video, still images, audio, text, or the like) at any point in time, and the video may be recompiled (and/or re-edited) to incorporate the new answers and content.

The systems and methods disclosed herein provide advantages over conventional social media platforms. For example, the shareable video hosting platforms disclosed herein provide a collection of media that tells an entire story, which conventional social media platforms are incapable of performing. This beneficially allows a comprehensive story to be told in a single media file. Additionally, the platform may automatically compile and edit various media into a single video, providing a high-quality video output that flows from one piece of media to the next. This automatic compilation advantageously allows a user to present a polished story even if they have no media editing experience. A user may even select from a pre-set list of compilation features to cause the platform to edit the story based on user preferences (e.g., background music, colors, a photo montage pattern, etc.).

The platforms advantageously provide a mechanism for family stories to last long past the life of any storyteller such that family lore is never lost upon the passing of an individual. This provides the benefit of growing and strengthening family bonds. The platforms may further provide video editing capabilities to allow a user to tailor his or her video to his or her specific preferences. The platforms allow users to specify their relatives (e.g., an individual may tag and link family members such as parents, children, nieces and nephews, etc.) to create a fully linked family tree, thus allowing family members to share their stories with the entire family. The ability to share a compiled video story using only a QR code advantageously allows a user to quickly share his or her story without requiring the recipient to click through the profile of the user or write down a long uniform resource locator (URL).

Referring to FIG. 1, the features of the disclosure may be implemented using a system 100 that includes a network of electronic devices. For example, the system 100 may include a server 102 that hosts a shareable video hosting platform. The server 102 may include any one or more computing server (e.g., a distributed server system with separate discrete parts connected by a network) and may include a controller and a memory. The controller may include any controller, processor, or other discrete logic device. The controller is capable of performing specific actions on given data. The server 102 may also include a non-transitory local memory that stores information, for example, information that is usable by the controller. The stored information may be used by the controller to perform various functions. The local memory may further store data as requested by the controller. The server 102 may further include a network access device (e.g., a communication port such as a Wi-Fi port, a Bluetooth port, an Ethernet port, a fiber-optic port, or any other communication port).

The system 100 may further include a database 104 coupled to the server 102. The database 104 may include one or more non-transitory memory devices (e.g., hard disk drives) and may receive, store, and transmit information. For example, the server 102 may generate video or other data, may request storage of the data in the database 104, and may be capable of retrieving or otherwise accessing the stored data from the database 104.

The system 100 may further include a plurality of user devices 106. The user devices 106 may include any computing device such as a laptop, desktop, mobile phone, tablet, or any other device. The user devices 106 may each include a controller capable of performing logic functions and a non-transitory local memory capable of storing instructions usable by the controller as well as additional information (e.g., account information associated with a user of the device). The user devices 106 may further include one or more input device (e.g., a keyboard, mouse, camera, microphone, touchscreen, input/output port (such as a universal serial bus (USB) port), or the like) and one or more output device (e.g., a display, speaker, a touchscreen, an input/output port, or the like). The user device 106 may further include a network access device (e.g., a communication port such as a Wi-Fi port, a Bluetooth port, an Ethernet port, a fiber-optic port, or any other communication port). In that regard, the user device may communicate with the server 102 via the network access device of the user device 106 and the network access device of the server 102.

In some embodiments, each user device 106 may correspond to a separate user. In some embodiments, two or more user devices 106 may each correspond to a single user. In some embodiments, two or more users may access the platform using a single user device 106. In that regard, a user may access the platform hosted by the server 102 using a user device 106 so long as the account of the user is verified by the server 102. In some embodiments, three-factor authentication may be required by the server 102 to authenticate a specific user. In some embodiments, a user without an account may access the platform using a user device 106 but may have access to less functionality than a full user. For example, a non-user may view a video hosted by the platform and saved by the server 102 if the non-user has the specific uniform resource locator (URL) associated with a saved video or a QR code that is associated with the saved video.

The system 100 may also include or be coupled to one or more social media servers 108. The social media servers 108 may be associated with, or separate from, the server 102.

The social media servers 108 may host, for example, social media accounts of various users. The server 102 (and, potentially user devices 106) may communicate with the social media servers 108 to access information stored on the servers 108. For example, the social media accounts hosted by the social media servers 108 may include accounts associated with social media platforms that are separate from the platform that is hosted by the server 102, such as Facebook®, Instagram®, Twitter®, or the like.

The system 100 may also include or be coupled to one or more third-party server 110. For example, the third-party server 110 may include artificial intelligence tools, machine learning tools, cloud-based storage or functionality, or any other functionality that is provided by an entity separate from an operator of the server 102. For example, the platform may provide certain artificial intelligence-based features; in this example, the server 102 may access the artificial intelligence functionality via communications with the third-party server 110. As another example, the third-party server 110 may assist with functionality related to third-party authentication. As yet another example, the third-party server 110 may correspond to cloud-based data storage (e.g., photograph storage), and the server 102 may access the third-party server 102 to retrieve media to add to a video (e.g., as B-roll material). B-roll material may include any media that can be added to a video created using the platform that is not primary media; for example, videos recorded in response to a prompt for a specific theme may be regarded as primary media, and any additional media (e.g., pictures stored in a social media account) may be added to the video as secondary, or B-roll, material.

Figure 2:
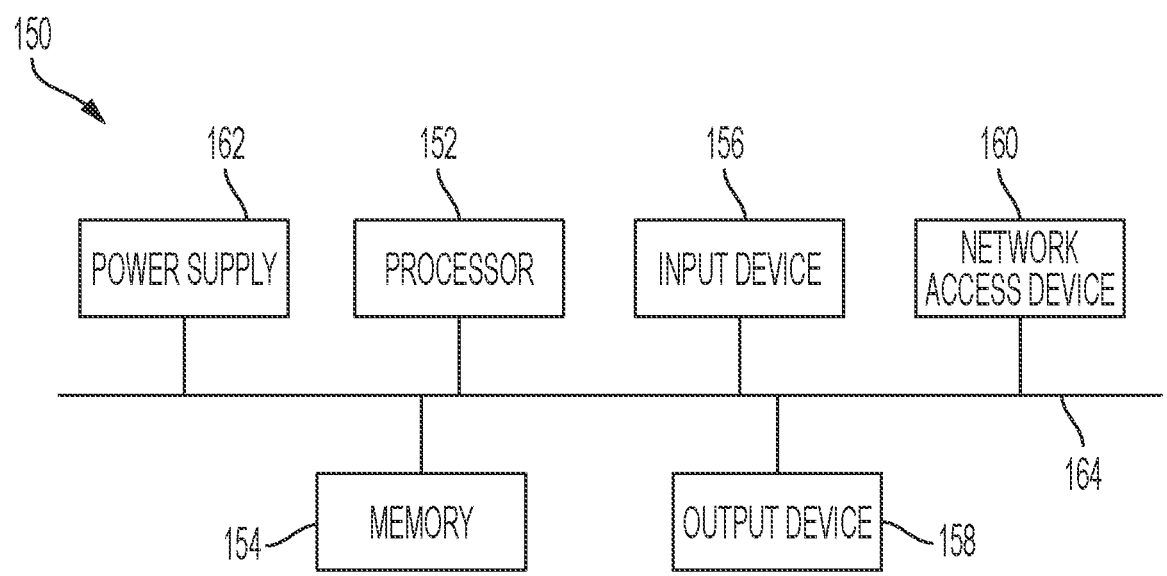
FIG. 2 is a block diagram illustrating features of an exemplary electronic device for use as part of the system of FIG. 1, according to some embodiments of the present disclosure.

Referring to FIGS. 1 and 2, an exemplary device 150 is shown. Any one or more of the server 102, the database 104, one or more user device 106, social media server 108, third party server 110, or any additional or alternative hardware devices may include some or all the features of the exemplary device 150. The device 150 may include greater or fewer components than shown in FIG. 2, may include duplicates of some components (e.g., the device 150 may be a dual processor device), or the like.

The device 150 may include a controller or processor 152. The processor 152 may include any controller or processor capable of performing logic functions. For example, the processor 152 may include an application-specific integrated circuit (ASIC), a general-purpose processor, a field programmable gate array (FPGA), any combination of discrete logic devices that perform logic functions, or the like. In some embodiments, the processor 152 may further include a memory that stores instructions usable by the processor 152 to perform logic functions (e.g., cache memory, RAM, or the like). The processor 152 may be housed within the device 150, may include remote functionality (e.g., by providing cloud-based processing), or any combination thereof.

The device 150 may further include a memory 154. The memory 154 may include any non-transitory memory such as random-access memory (RAM), dynamic random-access memory (DRAM) read-only memory (ROM), or any other type of memory. The memory 154 may be housed within the device 150, may include remote memory (e.g., cloud-based memory or an external database), may be external relative to the device 150 (e.g., an external hard drive), or any combination thereof. The memory may store information usable by the processor 152 to perform logic functions, may store information as requested by the processor 152 for later retrieval, or the like.

The device 150 may further include an input device 156. The input device 156 may include any one or more input device such as a mouse, a keyboard, a touchscreen, a microphone, or the like. The input device 156 may receive input from a user and convert the input into digital signals usable by the processor 152.

The device 150 may further include an output device 158. The output device 158 may include any one or more output device such as a display, a touchscreen, a printer, a speaker, or the like. The output device 158 may receive a digital signal from the processor 152 and may convert the digital signal into a format that can be interpreted by a user (e.g., text or images on a screen, audio data, or the like).

The device 150 may also include a network access device 160. The network access device 160 may include one or more device capable of communicating with external elements via any wired or wireless protocol. For example, the network access device 160 may be or may include a network card or adapter and port that facilitates communications via one or more protocol such as Ethernet, Bluetooth®, Wi-Fi, universal serial bus (USB), cellular protocols (e.g., 5G), or the like. In that regard, the network access device 160 may communicate with the processor 152, may transmit information from the processor 152 to a remote device as requested by the processor 152, and may transmit information from a remote device to the processor 152. The network access device 160 may communicate with remote devices (e.g., may communicate with a remote server via the internet), may communicate with local devices (e.g., may communicate with a local printer), or the like. In that regard, the server 102 and the user devices 106 may communicate with each other via respective network access devices 160 and external communication means (e.g., ethernet cables, Wi-Fi routers, 5G routers, or the like).

The device 150 may further include a power supply 162. The power supply 162 is designed to provide power to the device 150, providing electricity to the components of the device 150 to allow them to operate. The power supply 162 may include any power supply such as a cable and transformer designed to receive alternating current (AC) power from a wall socket, a battery, a supercapacitor, or any alternative or additional power supply.

The device 150 may also include connections or a bus 164. The connections or bus 164 may be connected to some or all components of the device 150 and may transmit at least one of a power signal or a data signal between components of the SCO device. For example, power from the power supply 162 may be transmitted to the various components via the connections or bus 164, the processor may control the output device 158 by placing instructions on the connections or bus 164, or the like. In some embodiments, a single bus may transport power and data signals, and in some embodiments, the connections or bus 164 may include two or more separate buses that separate transport power and data signals.

Figure 3:
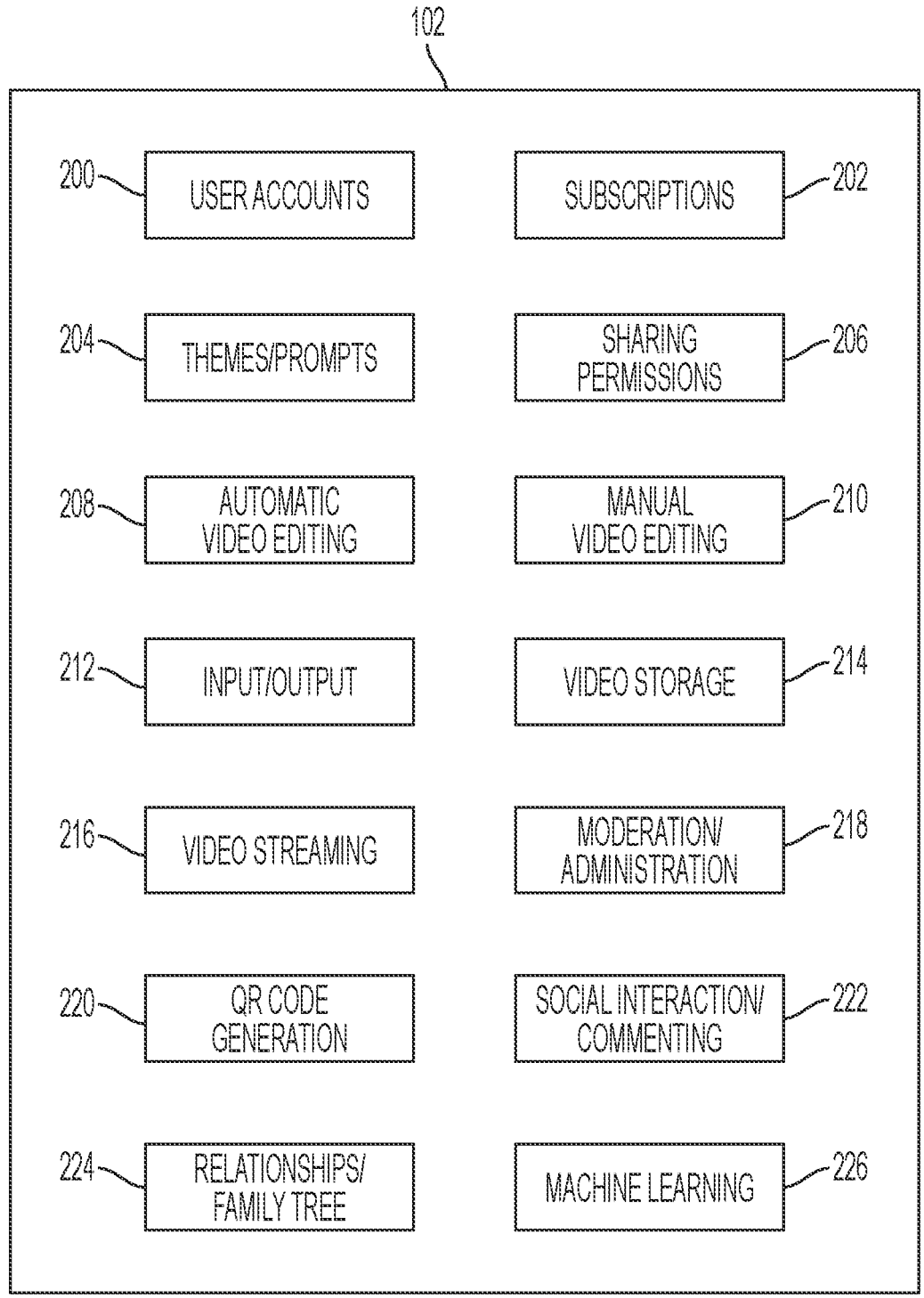
FIG. 3 is a block diagram illustrating functionality provided by a server of the system of FIG. 1, according to some embodiments of the present disclosure.

Referring now to FIGS. 1 and 3, the server 102 may be designed to perform various functions 200-226. The functions 200-226 may be performed by dedicated hardware, by software, by firmware, or any combination of dedicated hardware, software, or firmware. For example, the server 102 may include a general-purpose processor that operates software that is designed to achieve each of the functions 200-226. As another example. The server 102 may include dedicated processing units that are each designed to perform one or more of the functions 200-226. In some embodiments, the server 102 may be designed to achieve one or more of the functions 200-226 by accessing a third-party server 110. For example, the server 102 may transmit recorded data to a machine-learning server capable of performing artificial intelligence (AI) functions and may receive back processed data such that the communication with the third-party server 110 may be regarded as the machine learning function 226. In some embodiments, the server 102 may perform additional functions other than those shown in FIG. 4.

In some embodiments, the shareable video hosting platform may have certain features that are only available to registered users. The user account function 200 may handle user signups, may keep a record of registered users, and may delete user information after membership is no longer desired. The users may register by providing the server 102 with specific information such as a name, contact information, and payment information. Once the user has provided the information, the server 102 may generate a username or other identifier for the user, and either the server 102 may assign, or the user may select, a password to be associated with the username. In future communications with the server 102, the user may prove registration by providing the username and password to the server 102.

In some embodiments of the shareable video hosting platform, some functionality may only be available to registered users who have a certain subscription to the shareable video hosting platform. One or more of the subscriptions may have a one-time or periodic fee associated with the subscription. In that regard, the subscriptions function 202 may handle subscriptions related to the shareable video hosting platform. For example, the subscriptions function 202 may collect payment for the subscription and may keep a record of which registered users have also subscribed to one or more of the subscription plans. The subscriptions function 202 may also keep a record of which subscription plan each registered user has subscribed to. Certain functions of the platform may only be available to users of a certain paid subscription level, and the server may restrict use of these functions to only users with these subscriptions. Users may also be able to sign up for automatic renewals of the subscription plans and the function 202 may handle periodic billing based on the subscription plans and automatic renewals. When a user no longer wishes to subscribe, the subscriptions function 202 may remove the subscription from the associated user account. If a user attempts to perform a specific function of the shareable video hosting platform, the subscriptions function may inform other functions of the server 102 of which subscription level, if any, the user account has purchased.

Users, using their user device 106, may be able to go to a webpage on the platform to view their current subscription level. The page also lists alternative subscription types and features that go along with the subscriptions and allow the user to select a new subscription level. The users may further pay for their new or upgraded subscriptions using this page and may set up auto-payment or auto-renewal of their subscription (e.g., using a credit card or bank account information). The user may also be able to cancel their subscription on this page. The subscription page may also include preferences of the user and allow the user to change their preferences. For example, a user may wish for only family members to view their videos; the user may indicate this preference and the server 102 may restrict viewing of videos of the user to only family members.

The shareable video hosting platform may assist a registered user with creation of media (e.g., a video recording) for any of several themes. In that regard, the themes/prompts function 204 may provide specific functionality related to the various themes. For example, the themes may include "legacy," "autobiography," "engagement," "pregnancy," "life story," "resume," or the like. After selecting a theme, the function 204 may provide the user with multiple prompts related to the selected theme such that the user may record a video answer to the specific prompts. For example, if the engagement theme is selected, the function 204 may provide prompts to the user such as "how long were you dating before the engagement occurred," "where did the engagement occur," "show your engagement ring," or the like. The themes/prompts function 204 may store an ordered set of prompts for each of the themes such that the server 102 transmits the associated prompts to a user device 106 after the specific theme is selected.

After a user has created a video using the shareable video hosting platform (i.e., a posting user), the video may be hosted by the server 102 and available for viewing by other users and potentially non-users. The hosting user may set certain permissions regarding whom may view the posted video. The sharing permissions function 206 may store data regarding at least one of specific users or types of users that may view the posted video. For example, a posting user may set a rule that any registered member may view the video. As another example, a posting user may set a rule that only individuals that have at least one of a quick response (QR) code that links to the video or a website uniform resource locator (URL) that links to the video. In that regard, the URL may function as a hyperlink, or link, to the generated video. As yet another example, a posting user may set a rule that any individual that has a relationship with the posting user may view the posted video. Which rules apply to which registered users may be determined by the sharing permissions function 206.

After a user has recorded responses to prompts and provided any additional media (e.g., B-roll from the memory of the user device 106), various options for automatically editing the video may be available. The automatic video editing function 208 may perform functionality related to this automatic editing. Additional details regarding automatic editing will be discussed below.

In some embodiments, a user may also wish to perform some manual editing in addition to, or instead of, the automatic editing. In that regard, the server 102 may provide some or all of this manual editing in a manual editing function 210. For example, these manual editing tools may include the ability to remove portions of the video, adjust a length of the video, adjust an order in which various segments of the video are provided, adjust a theme or sentiment of at least a portion of the video, edit captions associated with specific portions of the video, cause the server 102 to re-edit the video using the automatic video editing function 208, or the like. In some embodiments, some or all these tools may be performed by software or hardware on the user device 106. In some embodiments, some or all these functions may be performed by the server 102. For example, upon selecting manual editing on a user device 106, the server 102 may cause the user device 106 to output the options for manual editing. Although the user selects the manual editing tools on the user device 106, the actual editing may be performed by the server 102 (and in some embodiments, may be performed by the user device 106).

The server 102 may also include an input/output function 212. The input/output function 212 may handle communications between the server 102 and various external devices (e.g., user devices 106, social media servers 108, third-party servers 110, or the like). For example, the input/output function 212 may package and transmit any data to be processed by the third-party server 110 and may receive the processed results from the third-party server 110. As another example, the input/output function 212 may handle communications between the various user devices 106 and the server 102 such as receiving login information, streaming a selected video to one or more user device 106, or the like. As yet another example, the input/output function 212 may also transmit login information related to a third-party social media site to a social media server 108 and receive information in return verifying the user account based on the login information. The input/output function 212 may also manage communications between the server 102 and the database 104 to ensure proper storage of data by the database 104 and proper retrieval of data from the database 104.

The server 102 may also perform a video storage function 214. The videos stored by the function 214 may include fully edited posted videos, compiled but unedited videos, segments of videos that will later be compiled into a full video (e.g., responses to prompts or B-roll video or other media). The video storage function 214 may also store other types of media such as music to be added to videos, pictures to be used as B-roll, or the like. In some embodiments, the video storage function 214 may compress and decompress media stored by the database 104. The video storage function 214 may also determine which user account (e.g., registered users) are associated with each stored video, which link is associated with each video, which QR code is associated with each video, or the like.

The server 102 may also perform a video streaming function 216. The video streaming function 216 may compile any segments of a video together to facilitate streaming of the entire video. The video streaming function 216 may also perform certain compression and decompression algorithms to facilitate relatively quick upload, download, and streaming of the videos, and may perform any additional or alternative processes related to video streaming.

Certain user accounts may be associated with a moderator account or an administrator account, and the server 102 may be designed to provide a moderation/administration function 218. For example, the function 218 may determine which registered users are associated with a moderator or administrator account and may facilitate operations that may be performed by moderators or administrators. For example, a moderator may view all content that is shared on the shareable video hosting platform regardless of the sharing permissions associated with the video. The moderator may also receive indications of any videos that have been reported by other users (e.g., for inappropriate behavior) as well ad view the name of the user who reported the content, the reason the content was reported, and information associated with the account that posted or shared the content. The moderator may also be able to disable sharing of any content or delete content from the platform on a case-by-case basis based on his/her analysis of the video and whether it has violated any rules of the shareable video hosting platform. The moderator may also be able to report the account that is associated with disabled/deleted content for further action regarding the account.

An administrator may be able to perform some of the functions of the moderator, some different functions, or the like. For example, an administrator can view basic account information for users such as names, email addresses, subscription status, payment status, age of the account, quantity of videos created, shared, or reported, or the like. The administrator may also be able to search for users by name (e.g., real name or username) or by email address. The administrator may also be able to view accounts of users that have been reported by moderators and may be able to filter lists of users by reported status and whether the account of the user is enabled or disabled. The administrator may also be able to filter lists of users by subscription status (e.g., subscribed, not subscribed, cancelled) and to view only users that have been reported. The administrator may also have the ability to enable or disable user accounts, for example, based on reports by moderators and the administrator's determination of whether rules of the platform have been violated. If an administrator has disabled a user account, that user will no longer be able to access their account or contents thereof, including any videos they have created or shared, and videos created and posted by the user will no longer be viewable by users or viewers of the platform. The administrator may also be able to create, remove, and disable moderator accounts, for example, to allow new users to be moderators. Moderators may also be able to manage preset decks of prompts and associated themes available for selection by users. They may also add new decks of prompts or questions, and add, remove, or edit prompts or questions in existing decks. In some embodiments, administrators may also be able to perform any functions assigned to moderators.

After a user has created and posted a video, the server 102 may identify or generate a link corresponding to a URL at which the video may be viewed. For example, the URL may be related to the username of the posting user or the real name of the posting user. In addition, the server 102 may generate a QR code associated with the specific user or with the specific video. In that regard, a QR code generation function 220 may generate or identify the link and may generate a unique QR code associated with the video. The function 220 may also generate or identify the URL. The function 220 may store information that links URLs and QR codes with specific videos or content. In that regard, in response to a user device 106 scanning a QR code, the function 220 may identify the location of the associated video and may work with the video streaming function 216 to allow the user device 106 to stream the associated video.

In some embodiments, users of the shareable video hosting platform may be able to communicate with each other in a similar manner as social media sites (e.g., by commenting on posts of other users, by direct messages between users, by group messages between identified users, or the like). A social interaction/commenting function 222 may facilitate these types of communications. For example, if a user comments on a video, the function 222 may cause the specific comment to be associated with the video and to show up when others view the video (based on rules set by the posting user).

In some embodiments, the server 102 may assist a user in determining (or may store data related to) relationships between users, such as a family tree. In that regard, a relationships/family tree function 224 may assign relationships between users based on received user input (e.g., if a user identifies another user as an uncle or brother) and may store information related to the relationships. In some embodiments, the function 224 may also automatically determine relationships between users, for example, based on existing known relationships. For example, if the server 102 is informed that user A is a brother of user B, and informed that users C and D are parents of user B, the function 224 may automatically determine that users C and D are also parents of user A.

In some embodiments, the server 102 may be capable of performing artificial intelligence or machine learning functions, which may be performed by a machine learning function 226. For example, the server 102 may be trained to identify speech patterns based on a plurality of training data, and may use the learned functionality to transcribe speech data into text. As another example, the server 102 may be trained to identify objects in images, and may use this learned functionality to identify specific objects in image or video data (for example, if a user wants the server 102 to identify and flag any footballs in a generated video).

Figure 4:
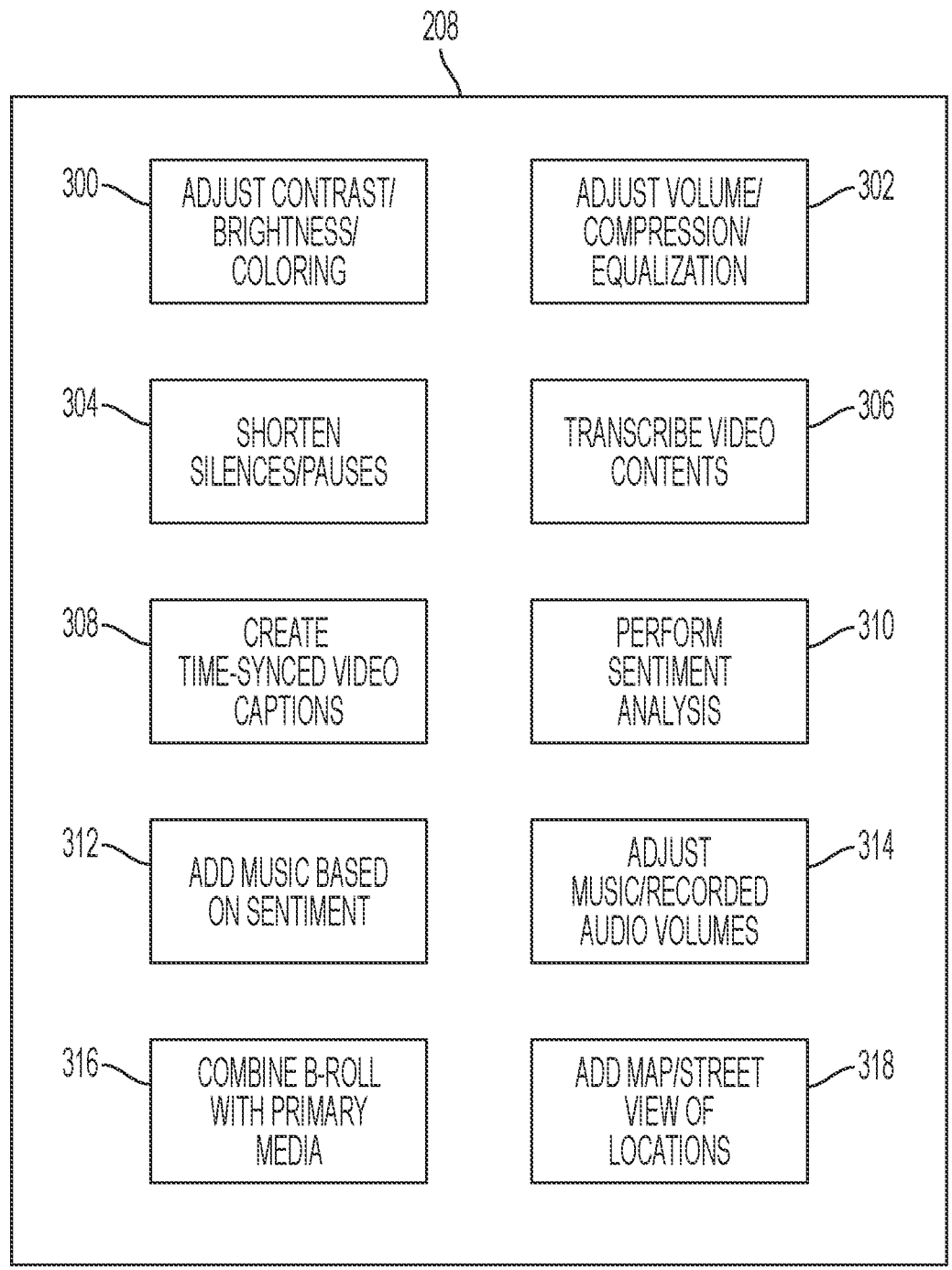
FIG. 4 is a block diagram illustrating functionality provided by a server of the system of FIG. 1 that relates to automatic editing of videos, according to some embodiments of the present disclosure.

Referring now to FIGS. 1, 3, and 4, the server 102 may be designed to perform certain functions 300-318 as part of the automatic video editing function 208. In some embodiments, the server 102 may be programmed with target values for certain features of video (e.g., a desirable ratio of speaker volume to background volume or desirable color warmth for an identified sentiment or mood). In some embodiments, the server 102 may utilize a machine learning algorithm to determine optimal values for certain features of video. For example, the server 102 may be trained with professional video to determine preferred color warmth for identified sentiments and may use the machine learning to determine an identified sentiment and a target color warmth for the sentiment.

In some embodiments, the server 102 may perform an automatic contrast/brightness/coloring function 300. Using this function, the server 102 may automatically adjust at least one of contrast, brightness, saturation, or color warmth of a video or of specific segments of video. For example, the server 102 may adjust the contrast, brightness, and/or coloring to reduce variations between multiple video segments, to achieve a specific mood based on the selected theme or identified content (e.g., to make colors darker when a speaker is discussing a death), or the like.

The server 102 may also perform a volume/compression/equalization adjustment function 302. For example, the function 302 may automatically adjust audio tracks of recorded or uploaded videos to normalize volume levels from one clip to another clip in a compiled video. The function 302 may also automatically apply compression or equalization to the audio to enhance clarity of speaking voices and reduce or minimize background noise in recorded video.

The server 102 may also perform a shorten silences/pauses function 304. Using this function 304, the server 102 may be able to detect silences and pauses in recorded video tracks and automatically reduce or remove these silences or pauses. For example, the server 102 may be trained to know that silences longer than 2 seconds are undesirable and to shorten any longer silences to 2 seconds or less.

The server 102 may also perform a transcribe video contents function 306. Using this function 306, the server 102 may identify spoken words in a video or in segments of video and generate text associated with the spoken words. In that regard, the server 102 may automatically generate closed captioning for any video to allow those with hearing disabilities to understand what is being said in any video segments.

Related to the function 306, the server 102 may also be capable of creating time-synced video captions for video using a create time-synced video captions function 308. In addition to identifying the spoken words and generating text that corresponds to the spoken words, the function 308 may be capable of determining when each word is spoken and of causing the text to be overlaid with the video at the timing that corresponds to the spoken versions of the words. In some embodiments, the function 308 may cause a chunk of related text to be output at once when a first word of the text is spoken. In some embodiments, the function 308 may cause each word in text to be output when the word is spoken. In some embodiments, a user may identify his preference regarding how and when the text is displayed, and the server 102 may cause the text to be displayed based on the user preference.

The server 102 may be capable of performing sentiment analysis using a perform sentiment analysis function 310. For example, for each segment of video, the server 102 may identify a sentiment that is associated with the segment of video. For example, the server 102 may perform this analysis by analyzing the transcribed text associated with the speech. The server 102 may divide the video into segments based on separate segments provided by the user, based on when sentiments change, or the like. In that regard, the server 102 may determine a specific sentiment for each segment of video. For example, the sentiments may include happy, joyful, cheerful, sad, longing, proud, or the like.

The server 102 may be capable of adding music to video segments based on the identified sentiment using an add music based on sentiment function 312. For example, the server 102 may have access to a royalty-free music library and may be provided with or may determine a sentiment for each track of music in the music library. The server 102 may select separate music for each video segment based on the identified sentiment and may cause the music to be played along with the video segment. In some embodiments, if a user indicates that he or she does not like the selected music, the user may change the determination of sentiment for the segment, may simply request selection of a new track, or may indicate a specific track that is desired for the segment.

The server 102 may also adjust volumes of music and recorded audio using an adjust music/recorded audio volumes function 314. This may be performed in a similar manner as the adjust volume/compression/equalization function 302. For example, the server 102 may automatically adjust at least one of the volume of music or the volume of recorded audio to ensure that speaking voices may be clearly heard and are not quieter than the playing of any simultaneous music. The function 314 may operate in tandem with the function 302 to ensure the spoken words are loud and clear and that the music does not drown out the spoken words.

The server 102 may also be designed to combine B-roll media with the primary media using a combine B-roll with primary media function 316. Primary media may be regarded as video that is recorded by a user in response to specific prompts (e.g., video of a user answering the question "how did you feel when you first laid eyes on your son"). For example, a user may provide a plurality of B-roll material (e.g., videos, pictures, audio tracks, or the like). In some embodiments, the user may determine locations at which the B-roll material is to be added. In some embodiments, the user may identify a sentiment of the B-roll material and the server 102 may automatically select a location for the B-roll media. In some embodiments, the server 102 may automatically determine a sentiment of the B-roll media and determine placement for the B-roll material. In some embodiments, the server 102 may determine placement for the B-roll material based on additional factors such as identified individuals within the B-roll material (e.g., showing pictures of a baby after the speaker mentions a baby in the audio data), based on identified objects in the B-roll material (e.g., showing an autographed baseball when mentioned in the audio data), or the like.

The server 102 may also be able to add map views or street views of locations discussed in the video using an add map/street view of locations function 318. For example, the server 102 may analyze the transcribed words to determine if any locations have been mentioned (e.g., the Statue of Liberty or the Intersection of Pacific Coast Highway and Beach Blvd in Huntington Beach). The server 102 may then obtain an image of a map view of the specific location, an image of the street view of the specific location, or royalty-free public images that are of the specific location. The server 102 may then either overlay the map/street view with the video or may show the map/street view in a portion of the video (e.g., in a bottom right corner as a picture-in-picture view).

Figure 5:
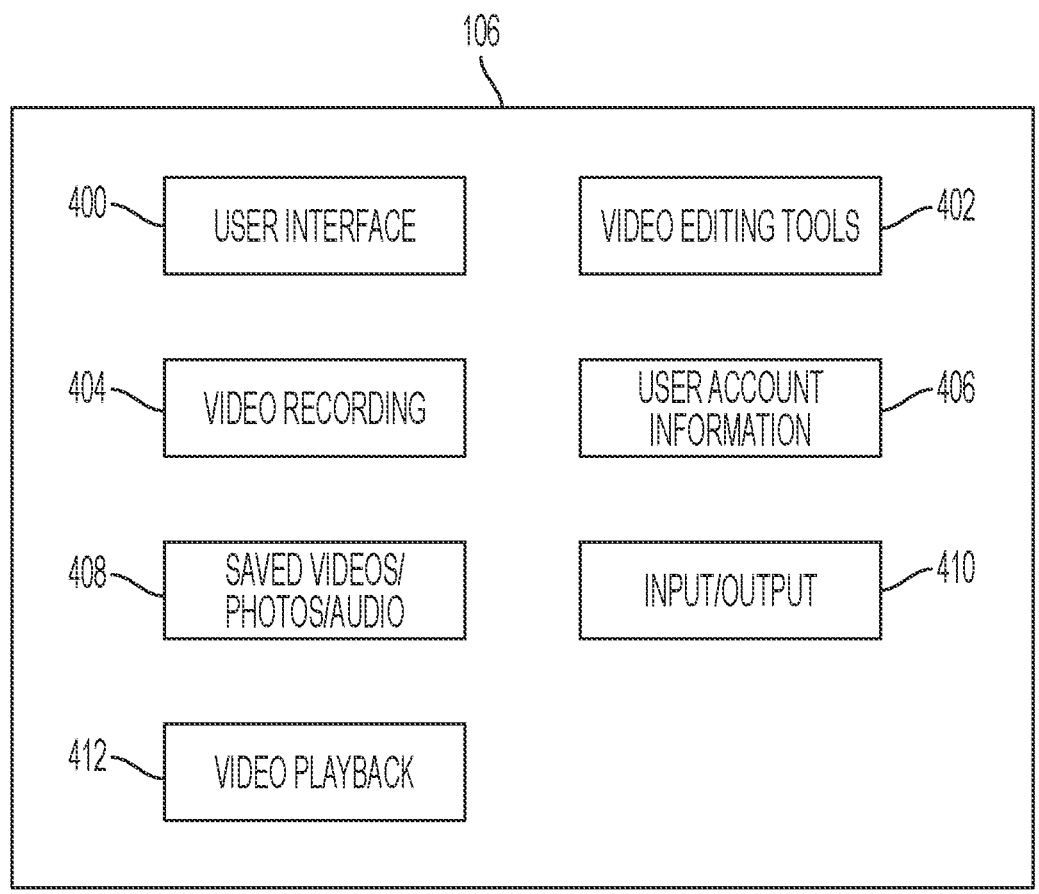
FIG. 5 is a block diagram illustrating functionality of a user device of the system of FIG. 1, according to some embodiments of the present disclosure.

Turning now to FIGS. 1 and 5, the user devices 106 may also be designed to perform certain functions. For example, these functions may be performed using hardware of the user device, using software installed on the user device 106 (e.g., downloaded software associated with the shareable video hosting platform), or by accessing certain functionality on the server (in a similar manner as software-as-a-service is accessed).

These functions may include a user interface function 400. The user interface function 400 may provide the ability for the user to interact with the shareable video hosting platform. For example, the user may view posted videos using the function 400, may make selections within the platform using the function 400 (e.g., selecting to create a new video with a specific theme), or the like. The user interface function 400 may be achieved using any one or more input or output device (e.g., a touchscreen, a speaker, a mouse, a keyboard, a display, or the like). The user interface may be designed by an operator of the shareable video hosting platform and may be included with a downloaded version of software associated with the shareable video hosting platform or may be accessed when a user accesses the platform on the server 102.

The user device 106 may also include a video editing tools function 402. The video editing function 402 may provide various tools which the user may use to manually adjust recorded video. The user may use the function 402 to make changes to the video before automatic processing by the server 102, after automatic processing, or at any other time. Users may also select to not perform any manual editing beyond the automatic editing by the server 102. The video editing tools provided by the function 402 may include the ability to adjust a theme or sentiment of a video. For example, the user may use a slider, dial, button, knob, or the like to select a theme and/or sentiment from a list of available options. By adjusting the sentiment of a video or video segment, the server 102 may change the selected music or editing style of the edited video according to the selected options. The manual editing tools may also include an option to adjust a length of the edited video. For example, if the server 102 automatically edits the video to an hour long video, the user may select a shorter or longer duration such that the server 102 includes more or less of the recorded video and/or B-roll media. The user may also be able to remove portions or segments of edited video; for example, if the user does not like the addition of certain B-roll material then the user may have this material removed. The user may also select a prompt to be removed such that the prompt and response thereto is not included in the edited video. The user may also request that the server 102 re-edit the video. For example, the user may make this request after indicating certain segments to be removed for the video to be recompiled and edited without the indicated segments. As another example, the user may change a sentiment of a specific segment and have the server re-edit the segment to select new music. The user may also utilize the user device 106 to edit video captions. For example, if the server 102 incorrectly transcribes speech, the user may use the user device 106 to correct the transcribed speech. The user may also use the user device 106 to accept or approve edited videos. By accepting an edited video, the shareable video hosting platform may proceed to a sharing process for the video to be shared (and a link and QR code to be generated).

The user device 106 may also perform a video recording function 404. This function may cause the camera and microphone of the user device 106 to detect image and audio data, and for a memory of the user device 106 to store the recorded image and audio data (or for the image and audio data to be transmitted to the server for storage).

The user device 106 may also store user account information associated with the user using a user account information function 406. For example, the user may request that the user device 106 store the user login and password information such that the user need not type them out each time he/she logs into the shareable video hosting platform. The user device 106 may also store information such as a type of membership the user has, family tree or relationship information, or the like.

The user device 106 may also have a saved videos/photos/audio function 408. This function 408 allows the user device to access videos, photos, and audio that have been recorded using the user device 106 (or otherwise transmitted to the user device). This function 408 also facilitates transmission of the stored media to the server 102 for use in a compiled video. The function 408 may also save a local copy of videos created by the user or created by other users and shared with the user.

The user device 106 may also perform an input/output function 410. The input/output function 410 may handle communications between the user devices 106 and various additional devices (e.g., the server 102, social media servers 108, third-party servers 110, or the like). For example, the input/output function 410 may package and transmit any data to be processed by the server 102 (e.g., media to be used as B-roll, primary media, login and password information, or the like) and may receive data from the server 102 (e.g., edited videos, videos posted by other users, or the like). As another example, the input/output function 410 may also transmit login information related to a third-party social media site to a social media server 108 and receive information in return verifying the user account based on the login information.

The user device 106 may also perform a video playback function 412. The function 412 may allow the user device 106 to output any videos or other media (e.g., audio or pictures) stored on the user device 106 to an output device of the user device 106. The function 412 may also allow the user device 106 to output video that is streamed to the user device 106 by the server 102. The video playback function 412 may facilitate features related to playback such as start, stop, pause, jump, fast-forward, rewind, or the like.

Figure 6A:
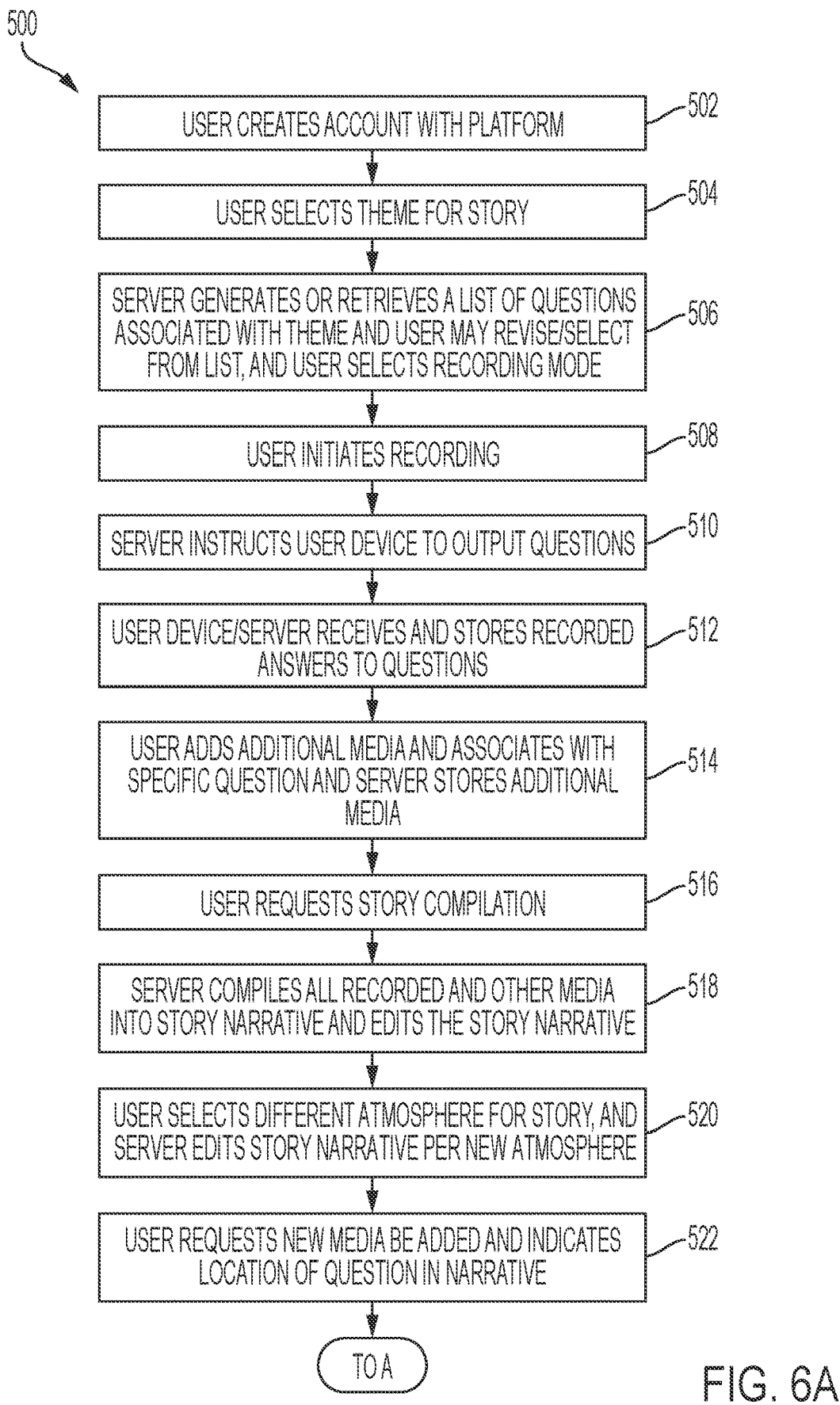
FIGS. 6A, 6B, and 6C are flowcharts illustrating an exemplary method for providing and using a shareable video hosting platform, according to some embodiments of the present disclosure.
Figure 6B:
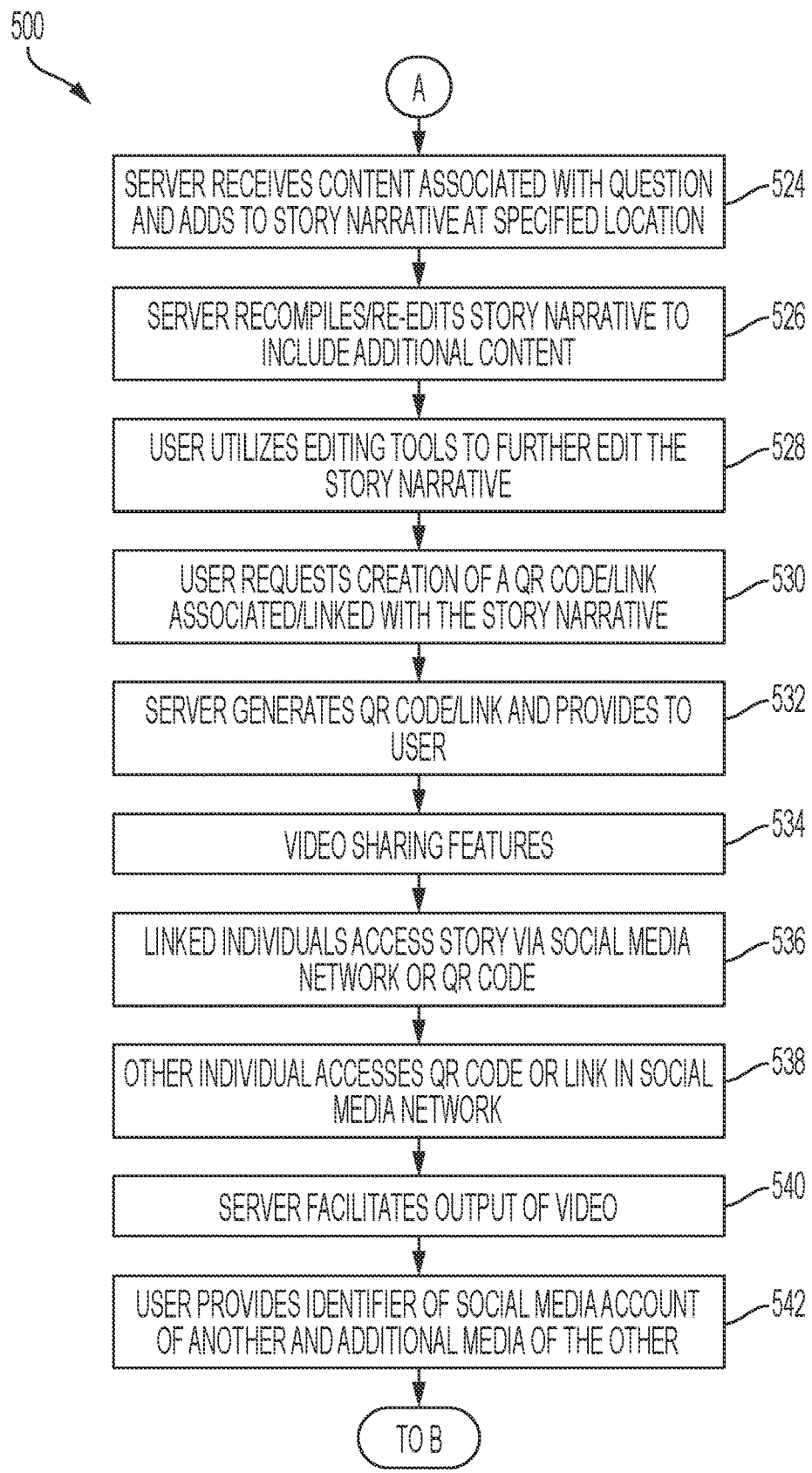
Figure 6C:
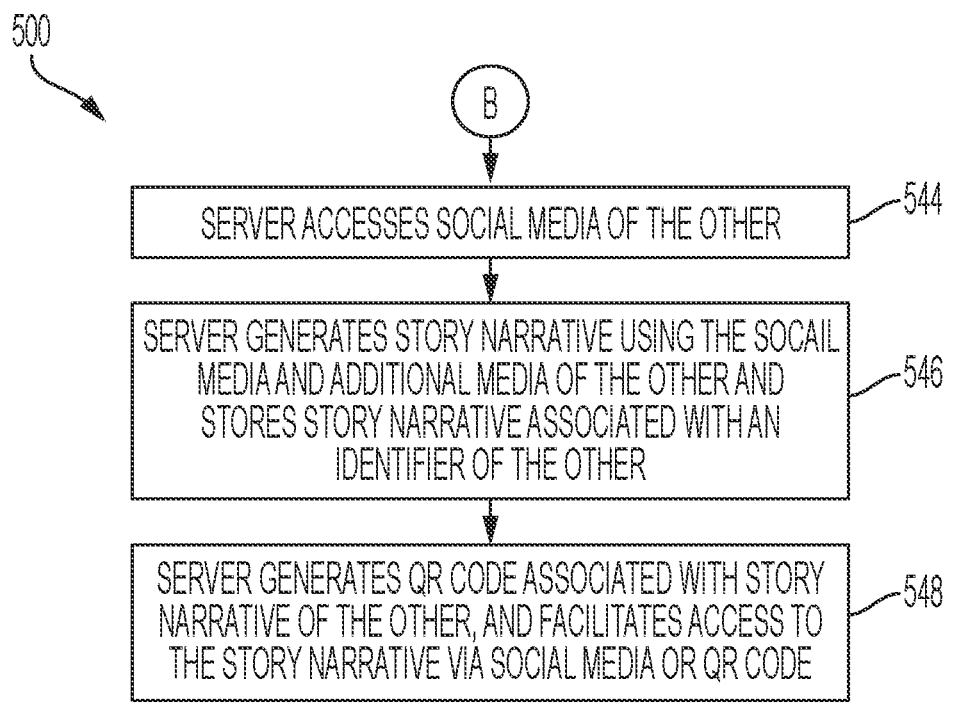

Referring now to FIGS. 6A-6C, an exemplary method 500 is shown. The method 500 may be used to provide a shareable video hosting platform for implementing the features disclosed herein. The various blocks of the method 500 may be performed sequentially, out of order, simultaneously, or in any other manner. In addition, some instances of the method 500 may skip certain blocks, some blocks may be added, some blocks may be repeated multiple times, or the like. The method 500 may be implemented using a system similar to the system 100 of FIG. 1 and discussed herein, or any other system that includes two or more electronic devices (e.g., a user device and a server). In some embodiments, any block of the method 500 that is performed by a server may also or instead be performed by a user device, and any block that is performed by a user device may also or instead be performed by a server.

In block 502, a user may create an account with a shareable video hosting platform. The platform may be hosted on a server or a group of servers (e.g., the server 102 of FIG. 1). The user may use a user device (e.g., a smartphone, a laptop, a tablet, or the like) to create the account, and during account creation, the user may provide information to the shareable video hosting platform such as a name, occupation, identity of family members, or the like. For example, the user may download a mobile application (e.g., an app) on his user device or may access a web-based interface with the platform, and the app or interface may offer an option for the user to create a new account. The user may select the new account option, and the app or interface may cause fillable fields to be created on a screen of the user device (e.g., a name field, an occupation field, etc.).

After an account has been created, a user may sign into the shareable video hosting platform using a username (e.g., an email address) and a password that was set when establishing the account. The user may also reset or change his password at any time using the platform. In some embodiments, two factor authentication may be required before a user can log in. For example, a user may be required to provide a username and password and may also be required to input a separate character string that was sent to an account (e.g., email or smartphone) provided by the user.

The user may provide pre-recorded media such as pictures, videos, audio, text, or the like to the shareable video hosting platform such that the media is available for use on the platform in a way that is associated with the newly created account. The user may also provide an identifier of a social media account on a separate social media platform (e.g., hosted on another social media server such as Facebook® or Instagram® by Meta®). The server may utilize all the received information along with information associated with the account on the other platform and may create an account for the user. In some embodiments, the user may create a new account by only providing an identifier and password of a separate social media platform (e.g., Facebook®), and the shareable video hosting platform may obtain all information required for account setup from the separate social media platform. The newly created account may be associated with family members and friends of the new user and may allow other users to view the information associated with the account. In some embodiments, the user may further make posts and upload additional media (e.g., pictures, videos, audio, text, check-ins, or the like).

In some embodiments, different subscription levels may be available for purchase from the platform. For example, it may be free to create an account under a free subscription, and the free subscription may provide access to some basic features of the platform. Additional levels of paid subscriptions may be available for purchase (e.g., with one-time payments or recurring payments), and each paid subscription level may offer a greater quantity (or greater quality of) features. For example, a free subscription may allow the user to create a video for a specific theme, but may not offer access to automatic video editing, whereas a first paid subscription level may offer access to basic automatic video editing (e.g., shorten silences and pauses and combine uploaded B-roll with recorded video responses), and a second paid subscription level may offer access to advanced video editing (e.g., sentiment analysis and addition of music based on determined sentiment). The user may select a subscription level when first creating the account with the platform and may upgrade or downgrade subscription levels at times after the initial account creation.

In block 504, the user may select (via the user device) a theme, or template, for a story that they wish to create. For example, the platform may list a plurality of themes and the user may select from the list. As another example, the user may speak or type a name of a theme and the server may select the most appropriate theme and ask the user to confirm that the selected theme is correct. For example, the user may say "I'm having a baby," and the platform may determine that the user has selected a theme such as pregnancy and identify that theme as the selected theme. The themes may be associated with specific life events (e.g., an engagement, a pregnancy, a message to earlier or later generations, a resume, or the like), or may be a general theme (e.g., an autobiography or general story). In some embodiments, a user may generate a story without selecting a specific theme. Each theme may include associated materials such as a list of questions or prompts related to the theme. In some embodiments, the platform may add certain features to a video based on the selected theme (e.g., a style of music, a color of text, generic B-roll materials such as royalty-free images, or the like). The user may be able to review the prompts associated with each theme before selecting a theme. The user may also be able to search for a theme by keyword (e.g., the user may search "pregnancy" for a pregnancy theme or a childbirth theme). The user may further be able to search for a theme by searching for a specific prompt; for example, the user may type in a question (e.g., "how do you feel about your child"), and the server may provide a list of all themes that include the prompt or a similar prompt.

In some embodiments, the user may also select an overarching emotion or atmosphere for the story narrative. For example, if the story narrative is centered around the passing of a family member, then the atmosphere may be a sad atmosphere, while a story centered around the birth of a child may have a happy atmosphere. If the user selects an atmosphere for the story narrative, then the server may include this selection when automatically editing the story narrative. For example, for a sad atmosphere, the server may use dark characters for transcribed speech and may darken the video, while for a happy atmosphere, the server may add random happy characters (e.g., balloons or birthday cakes) to the screen as B-roll material.

After identifying the theme of the story, the server may generate or retrieve a list of questions or prompts that are associated with the theme in block 506. The server may transmit the list of questions to the user device for outputting on the user device. For example, the server may be programmed (e.g., by a moderator or administrator account, or when the software for the platform was developed) to associate specific questions with specific themes. For example, questions or prompts associated with a pregnancy theme may include "why did you want to have children," "what are the most important things you wish to teach your child," "what should your child know about you," or the like.

In some embodiments, the user may review the list of questions or prompts on the user device and may edit the list of questions or prompts. For example, the user may type in additional prompts related to the theme and may select certain prompts for removal. In addition, the user may reorder the list of prompts in a way that makes sense for the story the user wants to tell. In some embodiments, the server may learn which additional prompts are popular for specific themes (e.g., by using an artificial intelligence algorithm) and may add such popular prompts to the list of prompts for the specific theme (e.g., if 10 users add a similar question then the server may add a similar version of the prompt to the list of prompts for the theme moving forward). After generating the list of questions, the server may allow the user to select which questions to answer, may allow the user to order the prompts in a preferred sequence, add questions, remove questions, or the like. In some embodiments, the server may suggest additional new prompts for the user based on the prompts which were selected by the user.

After generation and revision of the list of prompts by the user, the server may compile the prompts into a specific order, unless a desired order for the prompts has been provided by the user. In some embodiments, the user may revise the list of prompts after they have been compiled into the specific order by the server. If a user fails to provide a desirable sequence of questions, the server may utilize a function to order the questions in a logical sequence (e.g., by temporal order, or by asking related questions together), or in a sequence that was otherwise programmed into the server (e.g., by an administrator). In some embodiments, the server may include artificial intelligence or neural networks to facilitate constant learning by the server to allow the server to improve after multiple iterations. That is, if a significant quantity of users orders the prompts in a specific order, the server may learn the specific order using artificial intelligence and may order the prompts in that specific order moving forward.

In some embodiments, the user may select a specific recording mode for recording the user answers to the prompts. For example, the recording modes may include an interview mode and a self-interview mode. In the interview mode, the user device may activate a camera on a back of the mobile device (e.g., on a side of a mobile phone that is opposite a touchscreen). In the self-interview mode, the user device may activate a camera on a front of the mobile device (e.g., on a side of the mobile phone that is the same as the location of the touchscreen). In some embodiments, the user may select a spoken question mode in which a voice generated by the platform or recorded for such use speaks the questions aloud before the user responds to the prompts. In that regard, the user device acts as a moderator or interviewer by speaking the questions aloud before the user responds to them.

After the list of questions has been compiled and revised by the user and the desired recording mode, the user may indicate that he or she is ready to initiate recording in block 508. For example, the user may begin the recording process using an input device of the user device (e.g., by speaking "let's go," by clicking a "RECORD" button, or the like).

In block 510, the server may then instruct the user device to begin outputting the questions in the determined order, or the user device may begin outputting the questions in the determined order without server input. The questions may be displayed on a visual output device (e.g., a touchscreen) or output via speaker of the user device one-by-one and may function as a guided prompt, allowing the user to record their video by responding to one question at a time. In some embodiments, the prompts may be output once-at-a-time and a video response to the prompt may be recorded before the next prompt is output by the user device. In this way, the user may record specific responses to each prompt such that each specific response may be combined together into a story narrative.

In block 512, the user device may record video responses to the prompts using a camera of the user device (or coupled to the user device). The video responses may be stored on a local memory of the user device or may be transmitted to the server and stored remotely by the server (e.g., in the database 104 of FIG. 1 or in a cloud storage). In some embodiments, the video responses may be transmitted to the server as they are being recorded, and in some embodiments, the video responses may be packaged and uploaded after each recording is completed. If the user is unsatisfied with the answer he or she provided, he or she may request a redo of the answer. In such a situation, the stored video answer may be deleted, and the user device may begin recording a new response to the question.

Operation of the camera and related instruments of the user device may vary based on a selected recording mode. For example, if self-interview mode is selected then the user device (if a mobile phone) may cause a camera oriented in a same direction as a display to record video. If an interview mode is selected, then the user device (if a mobile phone) may cause a camera that is oriented in a direction opposite the display to record video.

In some embodiments, the user software (e.g., software of the shareable video hosting platform that runs on the user device) may detect picture quality, lighting, or other effects of the recording environment based on sensor data of the user device (e.g., camera data, inertial measurement unit (IMU) data, or the like). The software may then adjust various features of the mobile device to increase quality of video that is recorded. For example, if it is dark and thus difficult to view the user, the user software may turn on a light feature of the mobile device that illuminates an area in front of the operating camera. As another example, if the image of the user is blurry then the software may adjust a focus of the operating camera to obtain a higher quality recording. As yet another example, if the user is unintentionally shaking while holding the user device then the software may adjust orientation of the camera and remove an outer edge of the video to cause the user to remain centered in the recording.

In some embodiments and in block 514, the user may add additional media as part of an answer to a prompt. This additional media may include any previously or currently recorded media such as images, videos, text, audio, or the like, and any media that is not a direct response by the user to a prompt may be considered "B-roll" material. For example, the user may upload a photograph or video stored on the mobile device as B-roll material and may indicate which prompt the photograph or video is to be associated with. As another example, the user may point to a piece of media that is stored on a social media account (e.g., a video that was posted by the user in the past) and may indicate which prompt the media is to be associated with. As yet another example, the user may provide text or audio as B-roll material and may likewise indicate which prompt the text or audio is associated with. The server (or user device) may store the additional media as part of the answer to the specific prompt for which the media was associated with. The user may add the additional media as he is responding to each prompt or may add the additional media at any time (before, during, or after answering prompts). In some embodiments, the user may upload all B-roll material at one time, and the software of the user device may ask the user to indicate which prompt each piece of B-roll material is associated with. In some embodiments, after recording responses to each prompt, the platform may ask the user to upload any B-roll materials such as videos, images, audio, music, text, or the like.

In some embodiments, the server may provide suggestions of potential B-roll material. For example, the server may cause the user device to output an indication of subject matter that is popular B-roll material for a specific prompt or theme. As another example, the server may learn features about the user (e.g., hobbies) and may suggest B-roll material based on the learned features (e.g., the server may suggest that the user record video of him playing foosball if foosball is a hobby of the user).

After answering each prompt, the user may indicate that they are ready to proceed to the next question. The user may be able to review the recorded answers to prompts. In some embodiments, the user may determine that a recorded answer is insufficient. In these situations, the user may notify the platform that he wishes to re-record an answer to a prompt, and the server may delete a prior recording and allow the user to create a new response to the prompt.

The user may provide an answer to each subsequent question as described above and may further add additional media to be associated with each question at any point before, during, or after the recording process. The server (or user device) may store the recording and other media in a memory or in an associated database.

In some embodiments, the user may add additional media (i.e., B-roll material) after all questions have been answered. In that regard, the user may provide the media via the user device (or a link to the media, if hosted online) and may indicate which question or questions the media is to be associated with. In some embodiments, the shareable video hosting platform may prompt the user (e.g., by causing the user device to output a prompt) to add any additional media to the answers. As referenced above, the additional media may include photos, videos, or audio from a memory of the user device, media from the shareable video hosting platform or a separate social media platform, new media recorded by the user device, media stored on another user device, or stock media (e.g., photos, videos, audio) provided by the platform. The user may indicate which piece of media belongs with each prompt. The server (or user device) may store the additional media in a local or remote memory or database.

After the answers have been provided and any additional media has been provided, the user may request compilation of the media into a story narrative in block 516. For example, the story narrative may include a single video that includes the recorded answers to all prompts as well as B-roll material included. The server may compile the story narrative in the order of the prompts as identified by the user. In some embodiments, the server may utilize artificial intelligence to determine a logical sequence for the media. The logical sequence may be based on an order in which the events would typically occur, the order of the prompts, or the like. In some embodiments, the user may not provide prompts with which at least a portion of the B-roll material is associated. In that regard, the server may analyze the B-roll material and identify locations in the primary media (recorded answers to prompts) which make sense for the B-roll material. The server may insert each piece of B-roll material into locations where the content of the B-roll material makes sense (e.g., where the subject of the B-roll is similar to the subject being discussed in the primary video).

In block 518, the server may compile all of the primary media and B-roll material into a story narrative as described above. In some embodiments, the server may be capable of automatically editing (may auto-edit) the story narrative. A list of auto-editing features has been discussed above with reference to FIG. 4. In that regard, the server may perform any of the automatic editing functions that were discussed with reference to FIG. 4. For example, the server may remove any delay between segments of media (e.g., may remove a delay between answers to sequential prompts), may stitch together each segment, may add selected or otherwise free music to the narrative, or the like. In some embodiments, the server may be capable of timing the change between segments to align with changes in the music such that a dramatic image aligns with a crescendo in the music. The server may also cause dramatic B-roll material to be displayed or output during an emotional peak. The server may also reduce a volume of music when voice is present on a video and may increase the volume of the music when no voice is present. The resulting story narrative may include or be presented as a video montage that includes all media (video, pictures, audio, text, or the like) stitched together in the order of the prompts.

As described above, the server may be capable of performing sentiment analysis for various segments of the story narrative. In some embodiments, the server may have access to a library of royalty-free music (i.e., music that may be used without payment of royalties) and may select music that fits the identified sentiment. That is, the server may identify a sentiment for a specific portion of the story narrative and may select a piece of royalty-free music that matches the identified sentiment and may combine the royalty-free song with the recorded video. In some embodiments, the user may pay an additional fee for access to royalty-bearing music. In these embodiments, the server may select music that requires payment of associated royalty fees; in this way, the user is paying additional money to cover the royalty payments and in turn is provided with access to a larger music library. In some embodiments, the user may upload music of his preferred style, and the server may add music from the user's uploaded music in the story narrative. In these embodiments, the server may analyze whether a specific piece of music may be used in this way without paying royalties before adding the music to the story narrative; if royalties are due, the server may inform the user and select similar, royalty free music. In some embodiments, the user may provide a desired genre of music or identification of favorite bands to the server, and the server will select royalty-free music that best fits the user's preferred genre or favorite bands while still matching the identified sentiment.

As indicated above, the server may utilize an algorithm, such as an artificial intelligence algorithm, to compile and edit the story narrative. For example, as part of the sentiment analysis, the server may determine a location of peak emotion in the story narrative and may align the music to crescendo with the emotional peak of the video. As another example, as part of the sentiment analysis, the server may learn when a narrative switches from a first subject or topic (e.g., a gender reveal party) to a second subject or topic (e.g., a birth), and may change background colors, music, or the like based on the change in subject or topic. In this way, the server may be said to add artistic elements to the story narrative, thus generating a narrative of greater professionalism than it would otherwise be capable of.

In some embodiments, the user may request to have specific speech also output as text (in a similar manner as closed captioning). In that regard, the server may perform a speech-to-text algorithm on the speech in the media to generate text that corresponds to the speech and may add the text to the video at the times that correspond to the speech. This feature allows viewers of the story to read along with the narrated story, which reduces the likelihood of misunderstanding and increases understandability for the hearing impaired.

Additional auto-editing features may be provided by the server as described above with reference to FIG. 4. The server may take any one or more of these actions (with an action corresponding to each function in FIG. 4) when editing a video. In some embodiments, the user may request that a certain function not be performed during auto-editing. For example, the user may wish to select his own music to the story narrative and may request that the server not add music during auto-editing.

After viewing the auto-edited story narrative, the user may determine that a different atmosphere would better suit the story in block 520. For example, the user may have selected a serious atmosphere at the beginning of story creation but may determine that a lighter or more joking atmosphere is more appropriate. In that regard, the user may select (using the user device) a different atmosphere for the story. In some embodiments, the user may select a level of each type of atmosphere to better match the story narrative; for example, the user may select a value between 1 and 10 for a happy atmosphere, another value between 1 and 10 for a serious atmosphere, or the like. The server may then recompile the story using the new atmosphere selected by the user and may provide the updated story to the user for his or her approval (e.g., by streaming the video to the user device). The characteristics of each atmosphere may include anything that changes the feel of the story such as one or more background color, background music, lighting (e.g., lighter or darker lighting), sound effects (e.g., a serious atmosphere may include dramatic sound effects while a joking atmosphere may include funny sounds), or the like.

After reviewing the story narrative and in block 522, the user may wish to have additional media added to the story narrative. In that regard, the user may request addition of new media to the story narrative and may indicate a type of the new media. For example, the user may request addition of a new prompt and may provide a location in the sequence of prompts for the new prompt to be added. The user may then use the user device to record an answer to the new prompt. As another example, the user may upload new B-roll materials and may notify the server of which prompt (s) the new B-roll materials correspond to. The user may begin recording an answer to the additional prompt and may provide any additional B-roll media that corresponds to the additional prompt.

In block 524, the server may store the newly recorded or uploaded media in a local or remote memory. In block 526, the server may recompile and re-edit the story narrative to include the new answer and new media at the specific location in the story. In some embodiments, the new material may be edited into the story narrative, and, in some embodiments, the entire story narrative may be re-edited.

In some embodiments, the shareable video hosting platform may include features for manual video editing (i.e., video editing by a user) which users of the platform may utilize. In block 528, the user may further edit the story narrative using the manual editing tools of the platform. The tools provided by the platform may be relatively easy to use such that prior video editing experience is unnecessary for the user to perform the additional editing. In that regard, the platform may provide functionality such as drag-and-drop of pictures and video, selection of a specific period of time in the narrative for editing or deletion, or the like. For example, if the user wishes to overlay a picture over a specific video segment, the user may drag the picture to the location in the video and specify a time period in which the picture will be displayed. Similarly, the user may select new music for specific portions of the video and instruct the server as to the timing at which the new audio should be output. The user may further time the audio such that specific portions of the audio are reached at specific times in the video to align the video with the music. The user may also be able to use outside video editing software to further edit the videos. For example, the user may download the narrative to his or her user device, manipulate the video using editing software on the user device, and re-upload the edited version to the server. As another example, the user may access the video on the server using the user device and may edit the saved version of the narrative on the server.

Specific manual video editing tools provided by the platform may be provided by the server in a software-as-a-service model such that the user may utilize the tools from the user device, may be installed as part of the platform software on the user device, or any combination thereof. Specific manual video editing tools may include the ability to adjust an atmosphere or sentiment of a specific section of the story narrative. For example, the server may divide the narrative into separate sections (e.g., with each section corresponding to a separate prompt) and the user may adjust an atmosphere or sentiment of each section. For example, the user may be able to adjust the sentiment of a section of video using sliders, dials, selecting from lists of available options, or the like. Adjusting the sentiment or atmosphere of the video section may change the music selection or editing style of the edited video according to the user-selected options.

Another manual editing tool available to users is to adjust a length of the story narrative. In that regard, a user may select a target length for the story to cause the server to include more or less of the recorded video responses and to include more or less of the added B-roll media. In some embodiments, adjusting a length of the story may cause the server to lengthen or shorten pauses between video sections.

Another manual editing tool may include allowing the user to select portions of the edited video for removal. For example, the user may select a specific prompt from the list of prompts associated with the story narrative, which may cause the server to remove all associated recorded answers and B-roll material. As another example, the user may select one or more sections of the edited video for removal and may cause the specific segment(s) to be removed.

Another manual editing tool available to the user is the ability to edit video captions. That is, the user may at least one of add or delete text that was created as closed captioning by the automatic video editing. For example, if the speech was incorrectly transcribed then the user may correct the transcription. As another example, the user may delete text that the user does not wish to be visually displayed.

Another manual editing tool available to the user is to trigger the server to re-edit the video using the automatic video editing tools. In some embodiments, the server may re-edit the video using the automatic editing tools after any changes are made to the video using manual video editing.

Another manual editing tool available to the user is the ability to accept or approve automatically edited videos. Users may indicate whether the edited video is approved after viewing the edited video. Such acceptance or approval ends the video adjustment process and causes the method to proceed to a sharing portion of the process.

After the story narrative is approved, the method 500 may proceed to steps associated with sharing of the video. These steps may include, in block 530, the user requesting creation of a link or quick response (QR) code associated with the video. This response may be made, for example, by approving the edited video.

In response to this request and in block 532, the platform may generate a link at which the video may be viewed along with a quick response (QR) code that is associated with the link. For example, the server may host a website that may function at least in part as a social media platform, and each user may have his or her own page with various posts. Each post on the user's page may correspond to a story narrative created by the user using tools provided by the platform, and each post/video may be assigned a separate link. The platform may also generate a QR code that is associated with the link, such that a scan of the QR code provides an option to go directly to the video at the link. That is, user 1 may create a story narrative and request a link/QR code be generated and associated with the story. User 1 may share the QR code with his family members, who may scan the QR code using their respective user devices to view the compiled and edited video of user 1.

As mentioned above, the QR code may be associated with a link where the story narrative may be viewed, such that that a QR code reader can decipher the link and take a viewer to the video stored at the link. That is, the QR code may be a specific QR code that links to the unique video created by the user. In that regard, the user may share the QR code with others. For example, the QR code may be placed on a headstone, added to a photo book, included on a handout at a ceremony (e.g., a wedding, baptism, funeral, or the like), emailed, or the like. Anyone with access to the QR code may use an imaging device (e.g., a camera on a smartphone) to scan the QR code, which may then direct a browser of the user to the video. For example, scanning the QR code by a user device may open an internet location at which the video is stored so the story narrative can be output by the user device.

After creation of the video, the user may also be prompted to share the video on the shareable video hosting platform, and the video may remain on a page of the user as a post. For example, the user may include multiple narratives on his user page along with a description of each narrative (e.g., birth of first child, wedding, or the like). Another user of the platform may visit the user page and select one or more video to view based on the description. In some embodiments, a user may set a specific video as only accessible to certain individuals (e.g., shared with only verified family members, shared with only children, or the like). In that regard, only the identified and verified individuals may access and view the specific video.

The user may further download a copy of the video (e.g., to store on the user device), add the video to another location on the internet (e.g., a homepage of the user or another social media site), share the video on the decentralized web, share the video in metaverse applications, or the like. Another user device with access to the video (e.g., via a social media connection to the user, using the QR code, or the like) may wish to view the video, and the server may facilitate streaming of the video on the user device of the other user, or may facilitate downloading a copy of the video on the user device of the other user. In some embodiments, individuals without an account on the shareable video hosting platform may view videos for which they have a link or QR code, such that non-users may view videos so long as they are provided with a specific link or QR code associated with a video.

In block 534, the user may go through a list of options related to video sharing and may select values and options related to video sharing. For example, the user may restrict a specific video to be publicly viewable (e.g., any user with a link or QR code to the video may view) or privately viewable (e.g., to be viewable only by family members of the user). Some of the options related to sharing may only be available to users of a certain membership or subscription level, and other options may be available to any user regardless of membership or subscription level. In some embodiments, a user may sign up for various membership or subscription levels that may affect who can view the story narratives (e.g., a legacy membership may allow the user to indicate family and friends of the user and restrict viewing of videos to certain family or friends).

One potentially available sharing option includes the ability to customize the linked address (e.g., by selecting a customized uniform resource locator, or URL). When using this option, the user may be allowed to select any URL that is not already in use by the user or another user of the system. For example, the platform may assign the following URL to a specific user video: http://www.platform/user1/video1. The user may then revise the URL to: http://www.platform/user1/babybirth. In some embodiments, the platform may reserve or restrict certain URLs or paths for platform functionality and for content moderation. For example, the platform may restrict URLs containing words such as share, admin, moderator, name of platform, or the like.

Another potentially available sharing option is the ability for the platform to generate a QR code for each specific video or story narrative. In that regard, users for whom this feature is available may request generation of a unique QR code for each story narrative that is generated using the platform. The platform will then generate a unique QR code for each specific story narrative. The user is then able to view, download, print, or the like the QR code and may share the QR code with others. A recipient of the QR code may use an image capture device (e.g., a smartphone camera) to detect the QR code, which will then link to the specific URL at which the video is available. In this way, a user may share his video by sharing only the specific QR code associated with the video. As a note, the platform may be designed to maintain an association between a generated QR code and the associated URL link throughout the operation of the platform. That is, once a QR code is generated for a specific story narrative, that QR code may continue pointing to the URL for as long as the platform is in operation.

Another potentially available sharing option for users is the ability to customize contents of a page on which the story narrative is shared. For example, a home page of the user may contain links to all of the user's story narratives. The user may be able to adjust this page by, for example, adding a text description of each video, adding music or images to the page, adjusting coloring or lighting of the page, or the like. In some embodiments, the user may also adjust features of each page on which a video is stored. For example, the user may be able to add an additional personalized message that viewers of a video may view when watching the story narrative. This customization may include any type of customization such as reordering of objects on the page, addition or removal of text or images, addition or removal of music, adjustments to coloring or lighting, or the like.

In some embodiments, each story narrative may operate as a shared post in a social media context. In that regard, users that are allowed to view the story narratives may be able to add comments to each story narrative. Users of a certain subscription level may be able to enable or disable comments on each specific shared video. For example, a user may wish to allow comments on a narrative associated with the birth of a child but disable comments on a narrative associated with a disliked member of the family.

Another option available to certain users is the ability to share story narratives to external social media platforms. For example, a user may have an account with a third-party social media platform (e.g., Facebook®). The user may utilize features of the present platform to share story narratives on his wall on the third-party social media platform. In a similar manner, the user may be able to disable sharing of any of his videos on the platform or on third-party social media platforms.

In some embodiments, users may share their videos via sharing features located on the user device. For example, the user may utilize Share Sheets on a smartphone user device to share videos with other users.

In some situations, the user may be able to specify with whom the story narrative is to be shared. For example, users may select to allow the entire public to view their video. In that regard, any individual that has access to the link or QR code for the specific video will be allowed to view the video, and others may be able to view the video by going to a page associated with the user on the shareable video hosting platform. Users may also select to restrict viewing to only individuals that have a password assigned to the video; in this situation, people may only view the video if they have access to the link or QR code and also have the password to provide. The user may be discerning when selecting with whom to share the password to limit the quantity of views of the video. Users may also limit access to the video to only individuals who have received a specific invitation from the user. The user may transmit invitations through the platform and only recipients of an invitation will be allowed to view the video.

Users may also restrict sharing to individuals that are "friends" with the user on the shareable video hosting platform, such that no individual can view the video if the user has not approved being connected with the individual on the platform. Users who wish to invite viewers who are not members of the platform may transmit an invitation to the non-member viewer that allows the non-member to create an account (potentially for free) and view the video after the account has been created. Similarly, users may restrict sharing to individuals that are members of a family of the user. The platform may allow users to add information regarding their family members (e.g., siblings, parents, grandparents, aunts, uncles, children, grandchildren, etc.) and to create a connection with their family members on the platform. In some situations, the platform may determine at least one of familial relationships with the user or a potential family tree based on information provided to the platform, information shared with other platforms (e.g., social media networks), information retrieved from genealogy platforms (e.g., imported genealogy data from the platform), or the like. In these embodiments, the user may have the option to review and either confirm or deny each member of the family tree. In some embodiments, only administrative users can add members to a family tree; in these embodiments, users may provide an indication of their family members, but an administrator must approve the family link before any individuals are added to the family tree. In some situations, the user may determine to only share videos with family members, and only authorized members of the family tree may view the videos. In some embodiments, the user may be able to set types of relatives who are permitted access (e.g., only direct family members including parents, grandparents, children, siblings, and grandchildren can view, while aunts and uncles cannot view).

In block 536, individuals who are connected with the user on the shareable video hosting platform (e.g., "friends" on the platform) may receive a notification that the user has a new video available for viewing. For example, the platform may output a notification to all "friends" or family of the user informing them that a video is available for viewing. As another example, the user may email, text, or otherwise message the link or QR code associated with the link to the individuals. As yet another example, the user may post information regarding his new video on a social media network, and the individuals may notice the social media post and go to the user's account on the shareable video hosting platform to view the video.

In block 538, other individuals (i.e., users who are not linked with the sharing user on the shareable video hosting platform either as friends, family, or the like) may learn that the user has posted a new video. For example, these individuals may receive a link or QR code associated with the link from the sharing user. As another example, these users may notice a share on another social media network by the user notifying others that a new video is available for viewing.

In block 540, the server may facilitate output of the video by the user device for the individuals who are aware of the new video and who have permissions to view the video. For example, friends or family members of the user who shared a video may be connected with the user on the shareable video hosting platform, and may select a link on their user device, the link being sent by the sharing user. In these situations, the server of the shareable video hosting platform may facilitate streaming of the video using a modern web browser on the user device. As another example, a non-related individual may receive a QR code from the user that is associated with a link to the video. The non-related individual may scan the QR code using a user device to bring up a website from which the video may be streamed by a server of the shareable video hosting platform.

In cases where permissions are limited (either by password or relationship), the server may require additional information from the viewers before facilitating streaming of the video. For example, if the permission is limited by password, the server may only facilitate streaming if the correct password is input. If the permission is limited to those of a certain connection with the user (e.g., family) then the server may verify the relationship (e.g., by the viewer logging in to the shareable video hosting platform) before facilitating streaming of the video. If the permission is limited to only individuals that receive a specific invitation, then the server will only allow the video to stream for individuals who received the invite (e.g., the server may keep a list of allowed individuals and may only stream the video to these individuals). If an invited individual does not yet have an account with the shareable video hosting platform, then the individual may use a link provided by the sharing user to create a profile or account on the shareable video hosting platform; once the account is created then the server may facilitate streaming to the individual.

Users of the shareable video hosting platform may have the ability to comment on shared videos if commenting is turned on for the specific video. In that regard, during or after viewing a video, the viewing user may type out a comment to leave on the video. The comment may include any subject matter, and the sharing user may receive a notification of the comment and the ability to view the comment. Comments may include text, video, pictures, audio, or any other type of data.

Certain subject matter may not be allowed by policies of the shareable video hosting platform (e.g., nudity, threats of harm, or the like). Any viewer of a video may have the ability to report content of a video or a comment for violating the policies of the platform. As part of the reporting, the reporting user may select a reason for reporting the content (e.g., from a list that includes nudity, vulgarity, threats, or the like). When a video has been reported for content, a moderator may receive a notification of the reporting along with the reason(s) provided by the reporting user. The moderator then has the ability to determine whether the content has violated any rules and, if so, to remove the content from the platform. Moderators may take other actions in addition to, or instead of, removing the content such as cancelling the user's membership, submitting a warning to the user, or the like.

In some embodiments, individuals may wish to create a video for a relative or individual who is incapacitated or deceased. In that regard and in block 542, the user may provide media and other information relating to the individual to the server of the shareable video hosting platform. This information may include media associated with the individual (e.g., videos or pictures that include the individual), links to social media accounts of the individual (e.g., links to the individual's Facebook page), a recorded story by the user about the individual, or the like. In some embodiments, the user may select a theme for a story narrative that they would like the platform to generate about the individual. The server may receive and store all received media. The server may also access the third-party social media account(s) of the individual (block 544) and download and store information from the social media account (e.g., any information such as nicknames, likes and dislikes, friends of the individual, media posted on the individual's page, or the like).

Based on the received and accessed information along with the selected theme, the server may generate a story narrative in block 546. For example, the server may compile all of the received and accessed media into a story narrative in a similar manner as described above. For example, if a theme is selected by the user, then the server may use tools (e.g., artificial intelligence tools) to identify media that fits the selected theme for the video. For example, if the subject is migration of the individual to a new country, then the server may utilize an algorithm (which may include artificial intelligence) to select only media associated with the migration. For example, it may select media associated with a flight to the new country, posts about the migration, posts associated with the individual obtaining citizenship, or the like. The server may also use similar tools to determine an order in which the media will be presented in the resulting story narrative based on the selected theme. In some embodiments, the server may identify a theme that best fits the media provided to the server and may orient the story narrative around the identified theme. For example, if most of the video of the individual relates to the individual getting married then the server may select a wedding or marriage theme.

Furthermore, the server may perform automatic editing of the story narrative as described above. The manual editing tools are available for the user to manually edit the story narrative as well. After editing and approval by the user, the server may then generate the revised or edited narrative and associate it with the name of the individual. The server may also automatically share the narrative with friends and family of the individual.

In block 548, the server may create a link at which the video is stored and a QR code that points to the link. The server may allow the user (or additional or alternative users) to share the link and/or QR code. The server may also facilitate streaming or viewing of the video based on set permissions, as described above. For example, the user who provided the media may only wish for family members to be able to view the story narrative; in this situation, the server will only allow verified family members to view the story narrative.

In summary, the shareable video hosting platform disclosed herein allows a user to create a personalized long-form video montage that compiles videos, pictures, and other media from their camera roll, social media sites, and/or stock footage in real time. The videos are shareable, can be created in a timeline format, and are timeless. Each individual video is linked to a customizable QR code that can be used on business cards, advertisements, headstones, and much more.

The shareable video hosting platform described herein is a long form video option centered around life events that really matter, with guided prompts and API Integration. The users may include any people with camera-equipped smartphones who take photos and videos to capture memories and do not know how to create an edited video. Examples of users include pregnant women who want to capture a timeline narrative of their pregnancy and include the life of their child growing up. Another style of user may be a grandfather who wants to leave a video for an unborn granddaughter. A highly anticipated user group will be businesses who want an easier and more affordable way to create videos so that they can market their products & services. With API integration, the shareable video hosting platform will be able to link to a deceased person's social media profiles, capture video & pictures stored on the account, and auto-generate a content rich narrative of their life that can be shared as a video montage, linked to the family's legacy tree, and as a QR code which can be installed on their headstone.

Whether an individual desires a video of their autobiography, to capture the special timeline throughout their pregnancy, to market their business, and many more situations, the software disclosed herein allows users to easily create a high-end video by utilizing the auto-editing video package with built-in guided prompts. The software creates intentional videos that capture the true essence of people's lives. It can create a content-rich video for a special moment in real time, or for an entire timeline of special moments, all without needing to know how to edit video. The videos can be shared on the shareable video hosting platform and uploaded to other social media sites. Each video is assigned a unique QR Code that is linked specifically to that video.

With people passing away every day and taking their life stories with them, oftentimes family members and friends are left regretting not having asked loved ones about their lives. A generation or two goes by and that person's memory fades from existence and future generations are left wondering what their family's ancestors were like. Relatives may be able to sift through family photo albums, or the random content on their social media profiles if they have access, but this fails to provide a full narrative of the individual.

Another advantage of the software described herein over the current art is that conventional platforms do not allow users to specify relations such as mother, grandmother etc. The platform described herein allows users to specify and link entire family trees so that individuals can leave behind stories and last remarks to specific people so that future generations will have the ability to explore the entire stories of their ancestor's lives and not just bits and pieces. The platform can further integrate with third party genealogy platforms to automatically identify family members and their specific relations.

There are also numerous social media accounts of deceased people. By linking the account to an application programming interface associated with the present platform, the present platform can capture the video and pictures stored on the account and auto-generate a content rich narrative of the life of the individual. This narrative can be shared as a video montage, linked to the family's legacy tree, and to a QR code which can be installed on their headstone.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method implemented in a computing system for providing a shareable media hosting platform, the method comprising:
    recording, by a user device, multiple video segments corresponding to a narrative of a user;
    storing, in a memory, the multiple video segments;
        receiving, by a processor, a user-selected theme for a single video stream, the theme being selected in response to a list of potential themes;
        automatically identifying, by the processor, a sequential order for the multiple video segments to be provided in the single video stream that tells the narrative of the user based on the user-selected theme;
        receiving, by the processor, additional user-provided media associated with the narrative of the user;
        automatically determining, by the processor, at least one sentiment expressed in the additional user-provided media;
        automatically identifying, by the processor, a location in the sequential order for the multiple video segments in which to position the additional user-provided media based on the determined at least one sentiment;
        combining, by the processor and in response to a request from the user device, the multiple video segments and the additional user-provided media into the single video stream in the sequential order that tells the narrative of the user;
        storing, by a server, the single video stream;
        associating, by the server, the single video stream with a specific hyperlink;
        generating, by the processor, a quick response (QR) code containing information corresponding to the specific hyperlink associated with the single video stream;
        detecting, from the user device or from another user device, image data corresponding to the QR code;
        deciphering, by the user device or the another user device, the specific hyperlink from the QR code;
        accessing, by the user device or the another user device, an internet location of the specific hyperlink; and
        displaying, by the user device or the another user device, the single video stream in response to accessing the internet location using the specific hyperlink.

2. The method of claim 1, further comprising automatically editing, by the processor, the single video stream to improve a quality of the single video stream.

3. The method of claim 2, wherein automatically editing the single video stream includes at least one of:
    reducing delay between at least two of the multiple video segments;
    adjusting at least one of a contrast, a brightness, or a coloring of at least one of the multiple video segments;
    adjusting at least one of a volume, a compression, or an equalization of audio of at least one of the multiple video segments;
    transcribing spoken words from at least one of the video segments into text and creating time-synced video captions based on the text;
    adjusting a volume of at least one of speech or music for at least one of the multiple video segments; or
    adding at least one of a map view or a street view of a location mentioned in at least one of the multiple video segments.

4. The method of claim 2, wherein automatically editing the single video stream includes:
    identifying a segment sentiment corresponding to at least one of the multiple video segments; and
    selecting and inserting music into the single video stream based on the identified segment sentiment.

5. The method of claim 1, wherein the processor is at least one of a processor of the user device or a processor of a server in communication with the user device.

6. The method of claim 1, further comprising:
    storing, by a server, a profile corresponding to the user of the user device; linking, by the server, the profile with another profile of another user based on a request from the user device or from another user device associated with the another profile; and
    facilitating, by the server, viewing of the single video stream by the another user device based on the link between the profile with the another profile.

7. The method of claim 6, further comprising:
    determining, based on information received from at least one of the user device or the another user device, that the user is related to the another user;
        determining, based on information received from the user device, that the single video stream is approved for viewing by family members only; and
        allowing, by the server, the another user device to view the single video stream in response to determining that the user is related to the another user.

8. The method of claim 1, further comprising:
    determining, by the processor and in response to user input, a theme of the narrative of the user;
        accessing, by the processor, a list of prompts associated with the determined user-selected theme; and outputting, by the user device, the prompts associated with the determined user-selected theme, such that each of the multiple video segments are recorded in response to one of the prompts.

9. The method of claim 8, further comprising:
receiving, by the processor, a request to reorder the list of prompts; and
reordering, by the processor, the multiple video segments in the single video stream based on the request to reorder the list of prompts.

10. The method of claim 1, further comprising:
outputting, by the user device, a list of manual video editing functions available for manual editing of the single video stream;
receiving, by the user device, information corresponding to manual edits to the single video stream; and
editing, by the processor, the single video stream based on the information corresponding to the manual edits to the single video stream.

11. A system for providing a shareable media hosting platform, the system comprising:
a user device having:
a camera configured to capture image data, the user device configured to record multiple video segments that each correspond to a narrative of a user,
an output device configured to output a list of potential themes, and
an input device configured to receive a user-selected theme for a single video stream from the list of potential themes;
a memory configured to store the multiple video segments; and
a processor configured to:
automatically identify a sequential order for the multiple video segments to be provided in the single video stream that tells the narrative of the user based on the user-selected theme,
receive additional user-provided media associated with the narrative of the user,
automatically determine at least one sentiment expressed in the additional user-provided media,
automatically identify a location in the sequential order for the multiple video segments in which to position the additional user-provided media based on the determined at least one sentiment,
combine the multiple video segments and the additional user-provided media into the single video stream in the sequential order that tells the narrative of the user in response to a request from the user device,
control the memory to store the single video stream,
associate the single video stream with a specific hyperlink, and
generate a quick response (QR) code containing information corresponding to the specific hyperlink associated with the single video stream,
wherein the user device or another user device is configured to:
detect image data corresponding to the QR code,
decipher the specific hyperlink from the QR code,
access an internet location of the specific hyperlink, and
display the single video stream in response to accessing the internet location using the specific hyperlink.

12. The system of claim 11, wherein the processor is further configured to automatically edit the single video stream to improve a quality of the single video stream.

13. The system of claim 12, wherein the processor is configured to automatically edit the single video stream by at least one of:
reducing delay between at least two of the multiple video segments;
adjusting at least one of a contrast, a brightness, or a coloring of at least one of the multiple video segments;
adjusting at least one of a volume, a compression, or an equalization of audio of at least one of the multiple video segments;
transcribing spoken words from at least one of the video segments into text and creating time-synced video captions based on the text;
adjusting a volume of at least one of speech or music for at least one of the multiple video segments; or
adding at least one of a map view or a street view of a location mentioned in at least one of the multiple video segments.

14. The method of claim 12, wherein the processor is configured to automatically edit the single video stream by:
identifying a segment sentiment corresponding to at least one of the multiple video segments; and
selecting and inserting music into the single video stream based on the identified segment sentiment.

15. The method of claim 11, wherein the processor is further configured to determine a theme of the narrative of the user based on user input received by the user device, and to access a list of prompts associated with the determined user-selected theme, and the user device is further configured to output the prompts associated with the determined user-selected theme such that each of the multiple video segments is recorded in response to one of the prompts.

16. A method for providing a shareable media hosting platform, the method comprising:
receiving, by a processor, a user-selected theme for a single video stream, the theme being selected in response to a list of potential themes;
outputting, by a user device, a plurality of prompts each associated with a selected the user-selected theme;
recording, by the user device, multiple video segments corresponding to a narrative of a user, each of the multiple video segments being provided in response to one of the plurality of prompts;
storing, in a memory, the multiple video segments;
automatically identifying, by the processor, a sequential order for the multiple video segments to be provided in the single video stream that tells the narrative of the user based on the user-selected theme;
receiving, by the processor, additional user-provided media associated with the narrative of the user;
automatically determining, by the processor, at least one sentiment expressed in the additional user-provided media;
automatically identifying, by the processor, a location in the sequential order for the multiple video segments in which to position the additional user-provided media based on the determined at least one sentiment;
combining, by a processor and in response to a request from the user device, the multiple video segments and the additional user-provided media into the single video stream in the sequential order that tells the narrative of the user;
automatically editing, by the processor, the single video stream to improve a quality of the single video stream, the automatically editing including at least one of:
reducing delay between at least two of the multiple video segments, adjusting at least one of a contrast, a brightness, or a coloring of at least one of the multiple video segments, adjusting at least one of a volume, a compression, or an equalization of audio of at least one of the multiple video segments, transcribing spoken words from at least one of the video segments into text and creating time-synced video captions based on the text, adjusting a volume of at least one of speech or music for at least one of the multiple video segments, or adding at least one of a map view or a street view of a location mentioned in at least one of the multiple video segments;

storing, by a server, the single video stream;

associating, by the server, the single video stream with a specific hyperlink; generating, by the processor, a quick response (QR) code containing information corresponding to the specific hyperlink associated with the single video stream;

detecting, from the user device or from another user device, image data corresponding to the QR code;

deciphering, by the user device or the another user device, the specific hyperlink from the QR code;

accessing, by the user device or the another user device, an internet location of the specific hyperlink; and displaying, by the user device or the another user device, the single video stream in response to accessing the internet location using the specific hyperlink.

17. The method of claim 16, further comprising:

outputting, by the user device, a list of manual video editing functions available for manual editing of the single video stream;

receiving, by the user device, information corresponding to manual edits to the single video stream; and editing, by the processor, the single video stream based on the information corresponding to the manual edits to the single video stream.

* * * * *